(12) United States Patent
Papineau et al.

(10) Patent No.: US 7,437,149 B1
(45) Date of Patent: Oct. 14, 2008

(54) METHOD AND SYSTEM FOR EXCHANGING DATA BETWEEN PORTABLE APPLICATIONS FOR MOBILE DEVICES

(75) Inventors: Scott Papineau, Shawnee Mission, KS (US); Jon Bostrom, Reno, NV (US); Dana Myers, Fairfield, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 434 days.

(21) Appl. No.: 10/808,120

(22) Filed: Mar. 23, 2004
(Under 37 CFR 1.47)

Related U.S. Application Data

(60) Provisional application No. 60/457,001, filed on Mar. 24, 2003, provisional application No. 60/457,010, filed on Mar. 24, 2003.

(51) Int. Cl.
*H04M 3/00* (2006.01)
(52) U.S. Cl. .................. 455/418; 709/217; 709/224
(58) Field of Classification Search .......... 709/250, 709/217, 224; 707/200; 455/418
See application file for complete search history.

(56) References Cited

U.S. PATENT DOCUMENTS

| | | | |
|---|---|---|---|
| 6,601,169 B2 | 7/2003 | Wallace, Jr. et al. | |
| 6,628,767 B1 | 9/2003 | Wellner et al. | |
| 6,754,621 B1 | 6/2004 | Cunningham et al. | |
| 6,959,309 B2 * | 10/2005 | Su et al. | 707/200 |
| 7,079,839 B1 | 7/2006 | Papineau | |
| 7,092,703 B1 * | 8/2006 | Papineau | 455/418 |
| 2001/0034771 A1 | 10/2001 | Hutsch et al. | |
| 2002/0069263 A1 | 6/2002 | Sears et al. | |
| 2002/0116633 A1 | 8/2002 | Kobayashi et al. | |
| 2002/0129129 A1 | 9/2002 | Bloch et al. | |
| 2003/0135851 A1 | 7/2003 | Dickey et al. | |
| 2003/0181193 A1 * | 9/2003 | Wilhelmsson et al. | 455/403 |
| 2003/0182626 A1 | 9/2003 | Davidov et al. | |
| 2004/0034853 A1 | 2/2004 | Gibbons et al. | |
| 2004/0111315 A1 | 6/2004 | Sharma et al. | |
| 2004/0111699 A1 | 6/2004 | Rockwell | |
| 2004/0123105 A1 | 6/2004 | Himmel et al. | |
| 2004/0127190 A1 * | 7/2004 | Hansson et al. | 455/403 |
| 2004/0152457 A1 | 8/2004 | Goldstein et al. | |
| 2004/0186918 A1 * | 9/2004 | Lonnofors et al. | 709/250 |
| 2004/0243519 A1 | 12/2004 | Perttila et al. | |
| 2004/0248561 A1 | 12/2004 | Nykanen et al. | |
| 2005/0009469 A1 | 1/2005 | Kotola | |

OTHER PUBLICATIONS

Article entitled "Sprint PCS J2ME Application Environment", dated Feb. 6, 2002, by Papineau.*
U.S. Appl. No. 11/455,370, Inventor: Scott Papineai, Filing Date: Jun. 19, 2006.
U.S. Appl. No. 11/455,380, Inventor: Scott Papineau, Filing Date: Jun. 19, 2006.
U.S. Appl. No. 10/761,748, Inventor: Scott Papineau, Filing Date: Jan. 21, 2004.
U.S. Appl. No. 10/808,271, Inventor: Scott Papineau, Filing Date: Mar. 23, 2004.
Office action mailed on Mar. 25, 2008 for U.S. Appl. No. 10/808,271.
Ex parte Simpson and Roberts, 218 USPQ 1020 (Board of Patent Appeals and Interference), opinion dated Mar. 31, 1982.

* cited by examiner

*Primary Examiner*—Tim Vo
*Assistant Examiner*—Mahesh H Dwivedi

(57) ABSTRACT

A mobile information device may execute a Java MIDlet or a non-MIDlet application. The mobile information device may further include an application management system that allows one or more object-oriented object classes to allow input and output data to be communicated between Java MIDlets in different MIDlet Suites and between non-MIDlet applications.

30 Claims, 16 Drawing Sheets

J2ME ARCHITECTURE

J2ME ARCHITECTURE

```
package com.sprintpcs.util { public class System ( )                    //pass output data to other MIDlets
        {                                      //or other non-MIDlet applications
        };

public class Muglet ( )                    //accept input from other MIDlets
        {                                      //or other non-MIDlet applications
        };
}
```

90 → public class System

92 → public class Muglet {

METHOD AND SYSTEM FOR EXCHANGING DATA BETWEEN PORTABLE APPLICATIONS FOR MOBILE DEVICES

RELATED APPLICATIONS

This application claims the benefit of U.S. Provisional Application No. 60/457,001, filed Mar. 24, 2003, and titled "Method and System for Exchanging Data Between Portable Applications for Mobile Devices," which is incorporated by reference herein. This application claims the benefit of U.S. Provisional Application No. 60/457,010, filed Mar. 24, 2003, and titled "Method and System for Exchanging Data Between Portable Applications for Mobile Devices," which is incorporated by reference herein.

FIELD OF THE INVENTION

This invention relates to communications on mobile devices. More specifically, it relates to a method and system for exchanging data between portable applications for mobile devices.

BACKGROUND OF THE INVENTION

Mobile devices such as mobile phones, personal digital/data assistants, ("PDA"), two-way pagers, etc. are relatively inexpensive, have become commonplace, and are available to most consumers. These mobile network devices can be wireless or wired mobile devices.

Such mobile devices are typically limited to small physical size, light weights and corresponding small display screen sizes. These mobile devices have a number of constraints including limited processing power, limited memory, limited battery life, a limited number of buttons on a user interface, etc.

The larger a processor in a mobile device, the larger the size and weight the device will be. The more memory in a device the more expensive it will be. Faster processors, more memory and color displays consume more battery power.

Content and service providers who provide content and services via mobile devices have to balance the physical constraints of such mobile devices along with the ability to provide applications and content that consumers actually want, and are willing to pay for. The content and services have to be provided to mobile devices in a format that is usable on the mobile device and have to be provided quickly since most users of mobile devices pay for content and services by the minute.

There are relatively few applications that have been created to be used on mobile devices that provide content in a format useable on the mobile devices. The applications that do exist include text-based micro-browsers for delivering real-time stock quotes, access to news, sports scores, weather forecasts, text-based electronic commerce applications and other types of text-based applications.

There are a number of problems associated with developing applications for mobile devices. One problem is that virtually every mobile device has a unique hardware platform. An application written for one mobile device hardware platform won't work on another hardware platform for another mobile device.

To help overcome this problem for devices in general, Sun Microsystems of Mountain View, Calif., developed the Java programming language. Java is a high-level programming language that was designed to be platform-neutral (i.e., it can be run on virtually any hardware platform). Java programs are compiled into byte-code and run in a special software environment known as a "virtual machine." This and other characteristics of Java make it a useful language for programming a large number of different types of applications for mobile devices. Java is typically used for programming small applications, called Java "applets."

When Java applets are downloaded onto a device they are executed by a Java virtual machine in a secure "sandbox." A sandbox is Java virtual machine security area for downloaded (i.e., remote or untrusted) applets. The sandbox is an area in which such applets are confined and prevented from accessing certain data and resources (e.g., system resources and data). Confinement to the sandbox prevents downloaded applets from carrying out potentially dangerous or malicious operations on the device. Applets have to "play" inside the sandbox, and any attempt to "escape" is thwarted by a Java security manager.

However, the full version of the Java programming language was too large to be used on mobile devices with constrained resources. When Sun Microsystems developed the second version of Java, it was split into three editions. The three editions include micro version, Java 2 Micro Edition ("J2ME") for small mobile devices, a standard version, Java 2 Standard Edition ("J2SE") for desktop or other larger devices, and an enterprise version, Java 2 Enterprise Edition ("J2EE") for multi-tier networking applications.

J2ME is cross-platform programming language that can be embedded into small application environments such as mobile phones, PDAs, two-way pagers, etc. The J2ME environment can be implemented specifically for an individual device through a Connected Limited Device Configuration ("CLDC"). This configuration is typically used for mobile devices that are battery operated, memory constrained, processor limited, low bandwidth, and provide high latency, network connectivity. The CLDC defines the basic libraries that must be present in a J2ME implementation so that a Java virtual machine can run the application across different hardware platforms and environments.

The J2ME Mobile Information Device Profile ("MIDP") is a set of Java Application Programming Interfaces ("API") that provides the runtime environment for J2ME applications using the CLDC. The MIDP manages applications, user interfaces, networking and input/output for the mobile device.

J2ME applications that conform to the MIDP are called "MIDlets" (instead of an applet). A group of related MIDlets can be grouped together to create a MIDlet Suite that can be used to provide a more complex application to a mobile device.

J2ME MIDlets are being used on mobile devices to provide platform independent applications on mobile devices such as games, audio and video players, site-specific applications (e.g., dynamic stock quote banner, dynamic news banner, etc.) device specific applications (e.g., new ring tones, new fonts, new graphical look-and-feel, etc.) and many other types of applications.

There are a number of problems associated with using MIDlets and MIDlet Suites on a mobile device. One problem is that for security reasons, one MIDlet Suite cannot launch another MIDlet Suite (i.e., act as its handler). Since the CLDC and MIDP does not define or use a Java security manager (i.e., a security manager is typically too big and complex for small devices), the interactions of MIDlets is limited to MIDlets packaged together in the same MIDlet Suite. However, the MIDP specification does not explicitly prohibit one MIDlet Suite from launching another MIDlet Suite.

Another problem is that a MIDlet in a one MIDlet Suite cannot accept input data from, or cannot provide output data to, another MIDlet in another MIDlet Suite because a MIDlet Suite is executed in its own sandbox. This limits the type of MIDlet applications that can be created for a mobile device and prevents the ability to allow interaction between MIDlets or MIDlet Suites that have already been created. Another problem is that a MIDlet Suite cannot accept input data from, or provide output data to other applications on the mobile device (i.e., non-MIDlet applications).

Thus, it is desirable to allow a J2ME MIDlet in a MIDlet Suite to accept data from, and provide data to, other MIDlets in other MIDlet Suites on a mobile device. It is also desirable to allow a MIDlet to accept data from, and provide data to, other non-MIDlet applications on a mobile device.

SUMMARY OF THE INVENTION

In accordance with preferred embodiments of the present invention, some of the problems associated with using J2ME MIDlets on mobile device are overcome. A method and system for exchanging data between portable applications for mobile devices is presented.

One aspect of the invention includes an application management system, which may use one or more object-oriented object classes to allow input and output data to be communicated between J2ME MIDlets in different MIDlet Suites and between MIDlets and non-MIDlet applications.

The foregoing and other features and advantages of embodiments of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein:

FIG. 7 illustrates an exemplary utility application programming interface;

DETAILED DESCRIPTION OF PREFERRED EMBODIMENTS

Exemplary Wireless Network System

Figure 1:
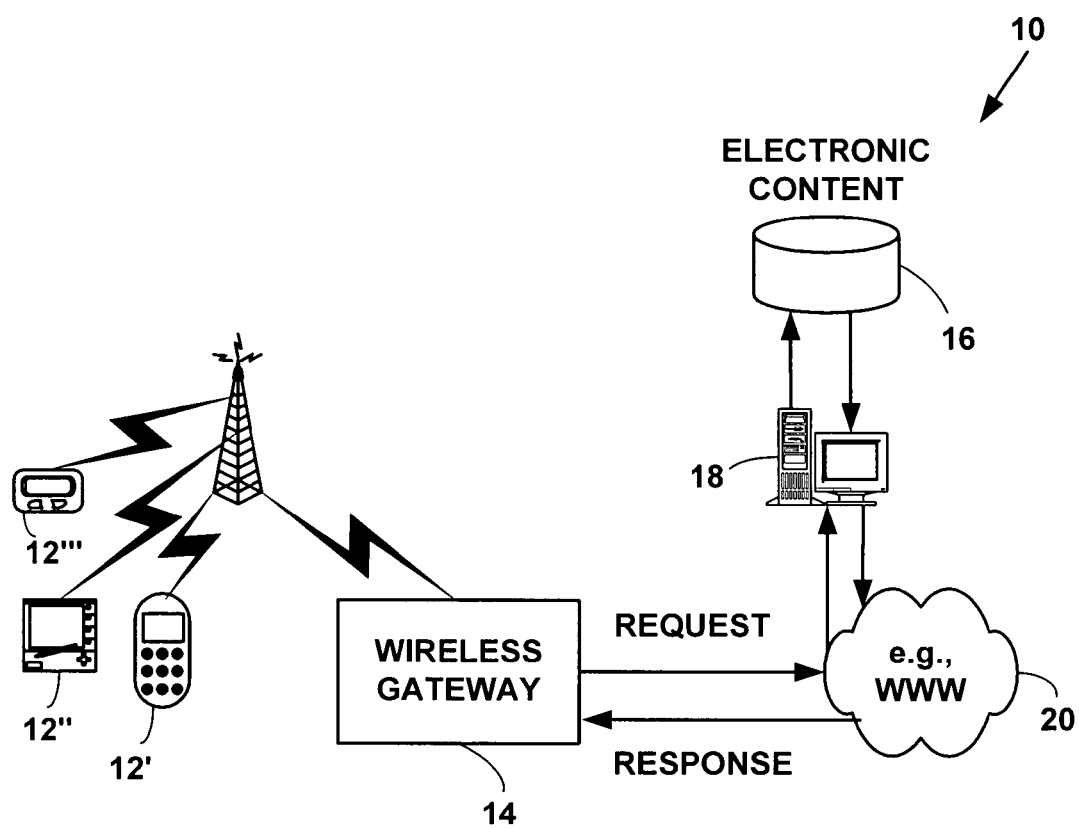
FIG. 1 is a block diagram illustrating an exemplary wireless network system.

FIG. 1 is a block diagram illustrating an exemplary wireless network system 10. Wireless network system 10 includes plural mobile information devices 12, plural wireless gateways 14, plural databases 16 including electronic content, plural database servers 18 and an information network 20. However, the present invention is not limited to these components and more, fewer or other components can also be used in wireless network system 10. For simplicity, only one wireless gateway 14, database 16 and database server 18 is illustrated in FIG. 1.

The mobile information devices 12 include mobile phones 12', personal digital/data assistants ("PDA") 12", one and two-way pagers 12''' and other types of wireless mobile and non-mobile information devices (not illustrated).

The wireless gateways 14 provides a code division multiple access ("CDMA"), Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Radio Frequency ("RF"), paging and wireless messaging, Packet Cellular Network ("PCN"), Global System for Mobile Communications, ("GSM"), Generic Packet Radio Services ("GPRS"), Personal Communications Services ("PCS"), Cellular Digital Packet Data ("CDPD"), Wireless Application Protocol ("WAP"), Digital Audio Broadcasting ("DAB"), Bluetooth, 802.11a, 802.11b, or other type of wireless interfaces for the mobile information devices 12.

Further information on these wireless interfaces may be found in their respective standards documents. CDMA, for example, is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

The WAP includes several protocols and standards designed to provide wireless devices with access to electronic content, and it was developed as an alternative to other markup languages and protocols developed for the World-Wide-Web. One component of the WAP is a Wireless Markup Language ("WML"), which includes markup tags, and provides control over formatting and layout of electronic content. The WML is often more appropriate to use for wireless devices such as wireless phones than other markup languages such as Hyper Text Markup Language ("HTML"), etc.

The databases 16 include electronic content such as text, hypertext, graphical data or references to graphical data images, audio, video and other content. The electronic content may be stored as a Web page or WAP page on a database server 18. The database server downloads or "serves" electronic content from the database 16 to the mobile information device.

A hypertext document includes markup codes called "tags." The structure of hypertext documents is defined by document markup languages such as Hand Held Device Markup Language ("HDML"), HTML, compact HTML ("cHTML"), eXtensible Markup Language ("XML"), WML and voice eXtensible Markup Language ("VoxML"), and others. Markup languages also allow references to additional electronic content besides text including graphics, animation, audio, video, applets, MIDlets and other electronic data.

Electronic content is typically displayed on a mobile information device 12 with a software application called a "browser." A browser on a mobile information device 12 may be a sub-set of a larger browser, or a micro-browser. A micro-browser may not be capable of displaying complete content of a requested electronic content as stored on database server 18. A micro-browser typically reads electronic content and renders the electronic content into a presentation of text, graphics, animation, audio, video, etc., for display on the mobile information device 12.

The information network 20 includes the Internet, the World-Wide-Web, an intranet, or other information network. As is known in the art, the Internet is a world-wide network of interconnected computers. The World-Wide-Web is an information system on the Internet designed for electronic content interchange.

The devices illustrated in FIG. 1 interact with wireless network system 10 based on standards proposed by the Institute of Electrical and Electronic Engineers ("IEEE"), International Telecommunications Union-Telecommunication Standardization Sector ("ITU"), Internet Engineering Task Force ("IETF"), Wireless Application Protocol Forum ("WAP") Forum, Java Community, the American National Standard Institute ("ANSI"), or other standards.

An operating environment for devices and interfaces used for the present invention include a processing system with one or more high speed Central Processing Unit(s) ("CPU"), or other types of processors, and a memory system. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU or processor. The computer readable medium includes cooperating or interconnected computer readable medium, which exist exclusively on the processing system or be distributed among multiple interconnected processing systems that may be local or remote to the processing system.

JAVA

As is shown in the art, Java is an object-oriented programming language developed by Sun Microsystems of Mountain View, Calif. Java is based on object-oriented programming techniques. As is known in the art, object-oriented programming is used to design computer software including object-oriented objects that are easy to create, cost effective to modify, and reusable. Object-oriented objects include "object data" and "object services." Object services are provided through "object methods" (also called "object operations" or "object functions"). Object methods typically operate on private data such as "instance data" or "object state data" that an object owns. A collection of objects is called an "object class" which is sometimes called an "object type." An object class acts as a template that describes the behavior of sets of objects. An object's implementation is typically encapsulated, and is hidden from public view. Object private instance data can only be accessed by object methods of an object class. Object public instance data is accessed through a public "object interface."

Java was designed to be platform-neutral (i.e., it can be run on virtually any hardware platform). Java programs are compiled into byte-code, which is not refined to the point of relying on platform-specific instructions. Java runs on a hardware device in a special software environment known as a "virtual machine."

This characteristic of Java makes it a useful language for programming a large number of different types of mobile information device 12 applications. Java is typically used in programming small applications, called Java "applets."

Java 2 Platform Micro Edition

The Java 2 Platform Micro Edition ("J2ME") is used to create applications for fixed and mobile wireless devices. J2ME is a subset of the Java 2 Platform Standard Edition ("J2SE").

J2ME includes two major elements: (1) configurations; and (2) profiles. J2ME configurations provide a set of libraries and a virtual machine for a category of wireless devices. A configuration is a specification that defines the minimum Java libraries and Java virtual machine capabilities for a mobile information device 12. A configuration is defined for classes of devices with similar memory requirements and processing power. J2ME configurations are defined for both fixed wireless devices and mobile wireless devices.

J2ME profiles are built on top of configurations to provide a run-time environment for a specific device. J2ME profiles manage applications, user interfaces, networking, input/output and other functionality of a device.

Figure 2:
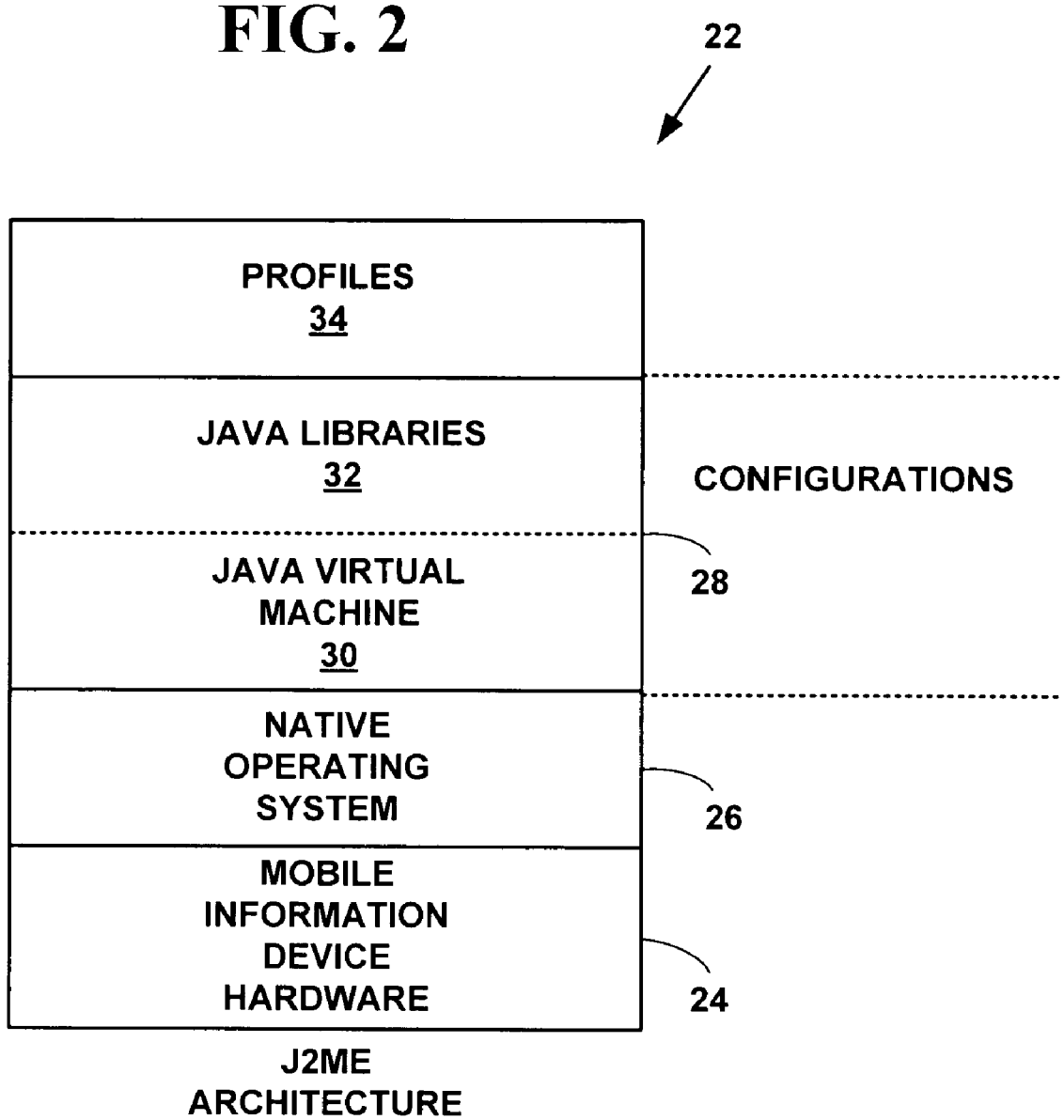
FIG. 2 is a block diagram illustrating an exemplary J2ME architecture.

FIG. 2 is a block diagram illustrating an exemplary J2ME architecture 22. The J2ME architecture 22 includes a mobile information device 12 hardware layer 24, a native operating system layer 26, a configuration layer 28 including a Java Virtual Machine 30 and Java libraries 32 and a profile layer 34.

The mobile information device hardware layer 24 includes the native hardware for the mobile information device 12. The native operating system layer 26 includes the native operating system being used on the mobile information device 12.

The configuration layer 28 provides a Java Virtual Machine ("JVM") 30. The Java libraries layer 32 includes Java core libraries, Java classes and Java APIs. As is known in the art, a JVM is an environment in which Java programs run. The JVM gives Java programs a software-based device they can interact with. The JVM allows a Java program to be run on virtually any physical device platform. The Java Virtual Machine layer 30 may include a Kilo Virtual Machine, a Compact Virtual Machine or other Java virtual machine.

The Kilo Virtual Machine ("KVM") is a complete Java runtime environment for small devices. It is a Java virtual machine as defined by the JVM Specification except for some specific deviations that are necessary for proper functioning on small devices. It is specifically designed for small, resource-constrained devices with a few hundred Kilobytes ("Kbytes") of total memory. The Compact Virtual Machine ("CVM") was designed for larger consumer and embedded devices. The CVM supports all Java 2 Platforms. However, the present invention is not limited to the two Java virtual machines described and other J2ME, Java or other virtual machines may be used.

Currently there are two widely used J2ME configurations 28 including the Connected Limited Device Configuration ("CLDC") and the Connected Device Configuration ("CDC").

The CLDC in the J2ME runtime environment targets small, resource-constrained devices, such as mobile phones, personal digital assistants, small retail payment terminals, etc. Typically, these devices run on either a 16- or 32-bit CPU or processor and have 512 Kbytes or less memory available for the Java platform and applications. The J2ME CLDC Specification, version 1.0a, JSR000030, is incorporated herein by reference.

The CDC is designed for next-generation devices with more robust resources (e.g., set-top boxes, in-car entertainment devices, Internet appliances etc.) Typically, these devices run on a 32-bit CPU or processor and have two Mega-bytes ("Mbytes") or more memory available for the Java platform and applications. The J2ME CDC Specification, version 1.0, JSR000036, is incorporated herein by reference.

Returning to FIG. 2, the profile layer 34 may include a Mobile Interface Device Profile ("MIDP"), PDA profile, Foundation profile, Personal profile, Remote Machine Invocation ("RMI") profile or other profile.

The MIDP extends the CLDC to provide domain specific APIs for user interfaces, networking, databases, and timers. The MIDP is typically used for wireless mobile phones and two-way pagers. The J2ME MIDP Specification, version 1.0, JSR000037, is incorporated herein by reference. The PDA profile is also based on the CLDC. It provides user interface APIs and data storage APIs for handheld devices such as PDAs. The J2ME PDA profile specification, JSR000075, is incorporated herein by reference.

The Foundation Profile extends the APIs provided by the CDC, but it does not provide any user interface APIs. The J2ME Foundation profile Specification, version 1.0, JSR000046, is incorporated by reference. As the name "foundation" implies, the Foundation profile is meant to serve as a foundation for other profiles, such as the Personal profile and the RMI profile.

The Personal profile extends the Foundation profile to provide Graphical User Interfaces ("GUIs") capable of running Java Web applets. The RMI profile extends the Foundation profile to provide Remote Method Invocation for devices. It is used with the CDC/Foundation profile. However, the Foundation profile is not currently used with CLDC/MIDP. The J2ME Personal profile specification, JSR000062, is incorporated herein by reference.

Figure 3:
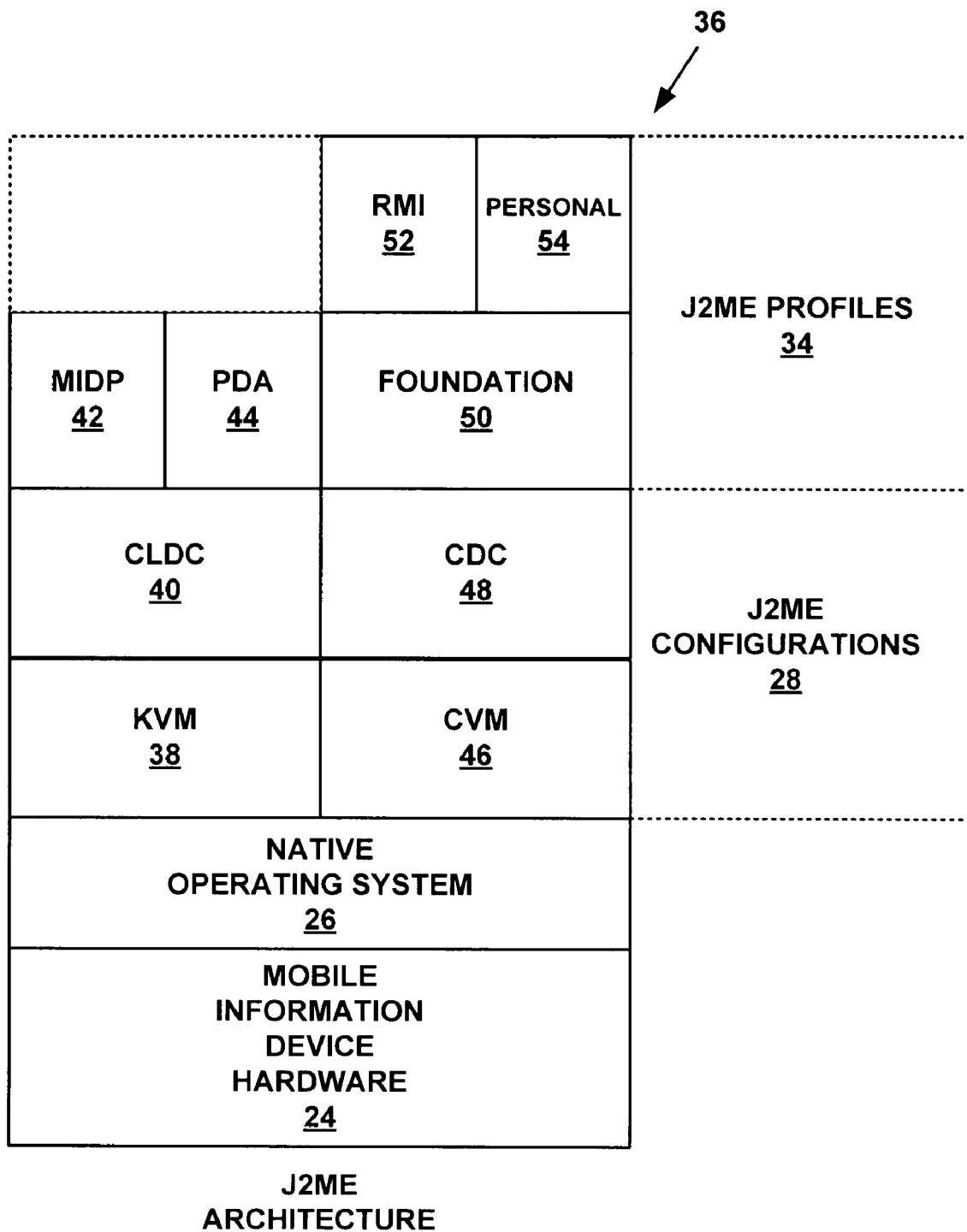
FIG. 3 is a block diagram illustrating further details of the exemplary J2ME architecture of FIG. 2.

FIG. 3 is a block diagram 36 illustrating further details of the exemplary J2ME architecture 22 of FIG. 2. In one variety, the J2ME architecture 36 configurations layer 28 includes a KVM 38 and a CLDC 40 below a J2ME profile including a MIDP 42 or a PDA profile 44. In another variety, the J2ME architecture 36 includes a J2ME configuration 28 with a CVM 46 and a CDC 48 below a J2ME profile 34 including a foundation profile 50 below a RMI profile 52 or a Personal profile 54. These two J2ME varieties are used separately and are not used in the same device at the same time.

J2ME applications that conform to the MIDP are called "MIDlets." A MIDlet, includes a public object class definition. This public object class includes object methods that have been inherited from the MIDlet class. MIDlets can be grouped together in a MIDlet Suite by creating a Java Archive ("JAR") file. An optional Java Application Descriptor ("JAD") file may be used to describe the MIDlets that constitute the MIDlet Suite.

MIDlets are the executable entities within the MIDlet Suite. The MIDlet Suite typically comprises: (1) Java class files enclosed in a JAR file; (2) a manifest file describing the contents of the JAR; and (3) resources (images, etc.) enclosed in a JAR file. A JAD file, which is technically not part of the MIDlet Suite, may be used in conjunction with the MIDlet suite.

In addition to class and resource files, a JAR typically includes a manifest file that describes the contents of the JAR. The manifest file typically is called "manifest.mf" and is stored in the JAR file itself. Table 1 lists some exemplary attributes that may be defined within the manifest file in a JAR. The manifest file, however, may include additional attributes, or it may omit some of the attributes listed in Table 1.

TABLE 1

| ATTRIBUTE | DESCRIPTION |
|---|---|
| MIDlet-Name | Name of the MIDlet "package". For example, "Stock Pack." |
| MIDlet-Version | Version number of the MIDlet. |
| MIDlet-Vendor | Who created the MIDlet. |
| MIDlet-Icon | Icon associated to show alongside the MIDlet-Name by the application manager. This is a graphics file stored as a PNG image. |
| MIDlet-Description | Text describing the MIDlet. |
| MIDlet-Info-URL | URL that may have more information about the MIDlet and/or the vendor. |
| MIDlet-<n> | This attribute contains up to three pieces of information: MIDlet name Icon for this MIDlet (optional) Class name the application manager will call to load this MIDlet. |
| MIDlet-Jar-URL | URL of the JAR file. |
| MIDlet-Jar-Size | The JAR file size in bytes. |
| MIDlet-Data-Size | The minimum number of bytes required for persistent data storage. |
| MicroEdition-Profile | What J2ME Profile is required by the MIDlet. (e.g., MIDP) |
| MicroEdition-Configuration | What J2ME Configuration is required by the MIDlet. (e.g., CLDC) |

Although not required, a JAR file may be used in conjunction with a JAD file. As with the manifest file, this file includes information about a MIDlet. The JAD provides information to an application manager about the contents of a JAR file.

With this information, decisions can be made as to whether or not a MIDlet is suitable for running on the device.

As an example, by looking at the attribute MIDlet-Data-Size, an application manager can determine if the MIDlet requires more persistent memory than the device can provide. The JAD provides means for parameters to be passed to a MIDlet without having to make changes to the JAR file. The JAD file can also use the same attributes as are listed Table 1. The JAD file, however, may use additional attributes, or it may omit some of the attributes listed in Table 1. Various types of MIDlets and MIDlet suites are created to provide functionality to mobile information devices 12.

Mobile Information Device J2ME Architecture

Figure 4:
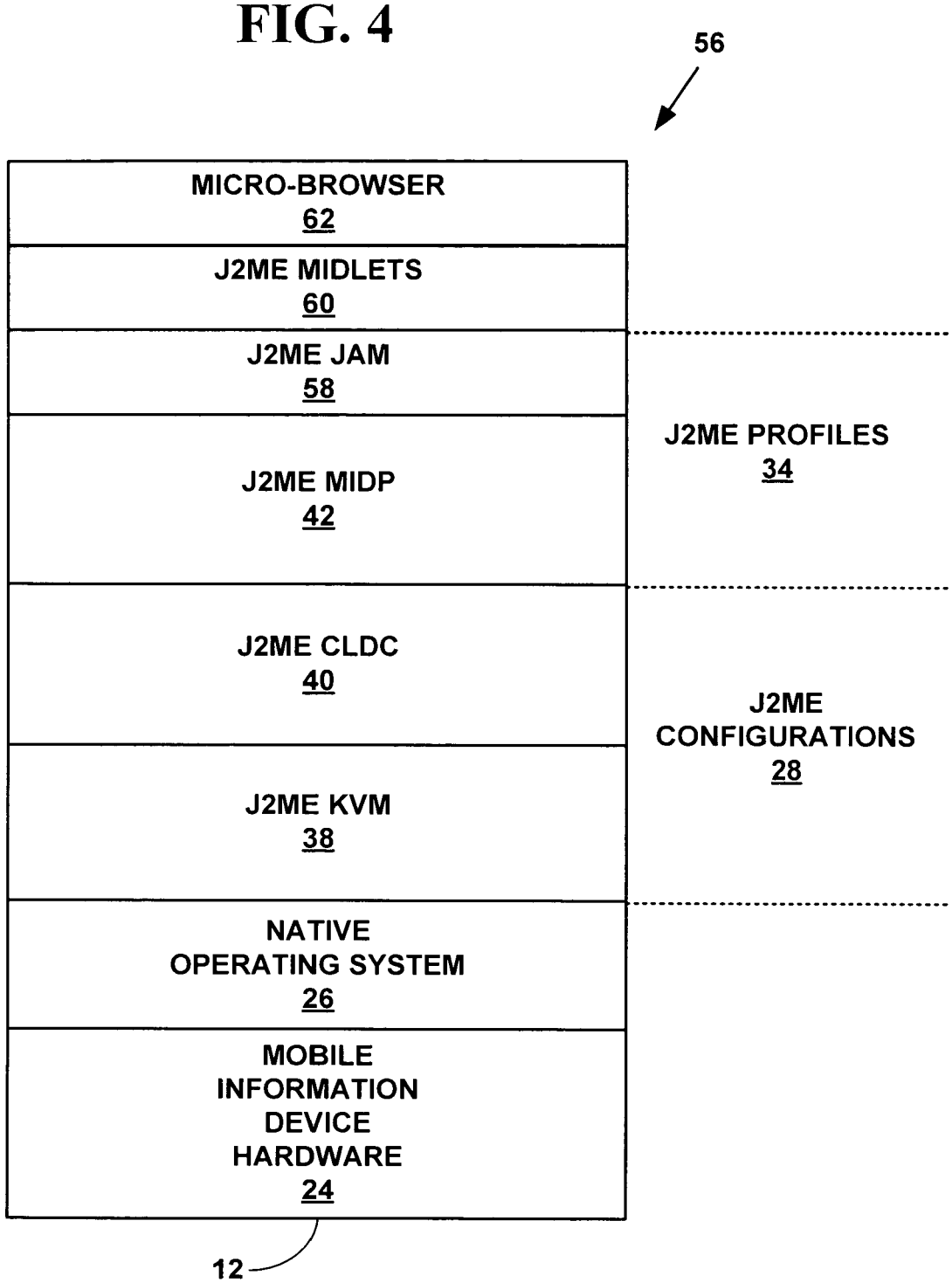
FIG. 4 is a block diagram illustrating an exemplary J2ME architecture for a mobile information device 12.

FIG. 4 is a block diagram illustrating an exemplary specific J2ME architecture 56 for a mobile information device 12. The architecture 56 includes a mobile information device hardware layer 24, native operating system layer 26, a J2ME configuration layer 28 including a J2ME KVM 38 and a J2ME CLDC 40, a J2ME profile layer 32 including a J2ME MIDP 42, a Java Application Manager ("JAM") 58, and one or more J2ME MIDlets in a MIDlet layer 60, and a micro-browser 62.

In J2ME, the a Java Application Manager ("JAM") 58 is an application that includes a set of functionality that downloads electronic content to the mobile information device 12 from a information network 20, manages the electronic content on the device, and manages lifecycles of MIDlets 60, from launch to termination. The micro-browser 62 displays electronic content and content served via network 20 from Web and/or WAP servers 18.

Electronic Content on a Mobile Information Device

There are many different methods for sending static (e.g., markup language) content to a mobile information device 12 including cHTML, WML, HTML, XHTML or others. Most electronic content on the Internet comes out of simple, static files. Dynamic content is also generated in application servers and Web servers, largely based upon information extracted from a database and capable of being modified dynamically (e.g., using XML, Java applets, Java Servlets, Enterprise JavaBeans ("EJBs"), MIDlets, or other server-side technologies).

A wireless gateway 14 typically distributes electronic content to the mobile information device 12 from a Web or WAP server 18. Once the electronic content is served to the mobile information device 12, it is typically rendered by a micro-browser 62.

Increasingly, Java applications, such as J2ME MIDlets that reside on a Web or WAP server 18 may be served through the information network 20 to mobile information devices 12 using the J2ME architecture 56 or other similarly layered architectures. The J2ME MIDlets are another type of electronic content. Such MIDlets may include applications for the mobile information device such as games, audio and video players, site-specific applications (e.g., dynamic stock banner, dynamic news banner, etc.) device specific applications (e.g., new ring tones, new graphical look-and-feel, etc.) and many other types of applications.

J2ME MIDlet Transfer Process

Once a MIDlet or MIDlet suite is created to provide a desired functionality and is ready to be distributed, it is loaded onto the mobile information device 12 by the J2ME JAM 58. The MIDP specification specifies that a manufacturer of a MIDP compliant device must provide an application manager (e.g., J2ME JAM 58) built into the device that can load a J2ME MIDlet onto the device.

Figure 5:
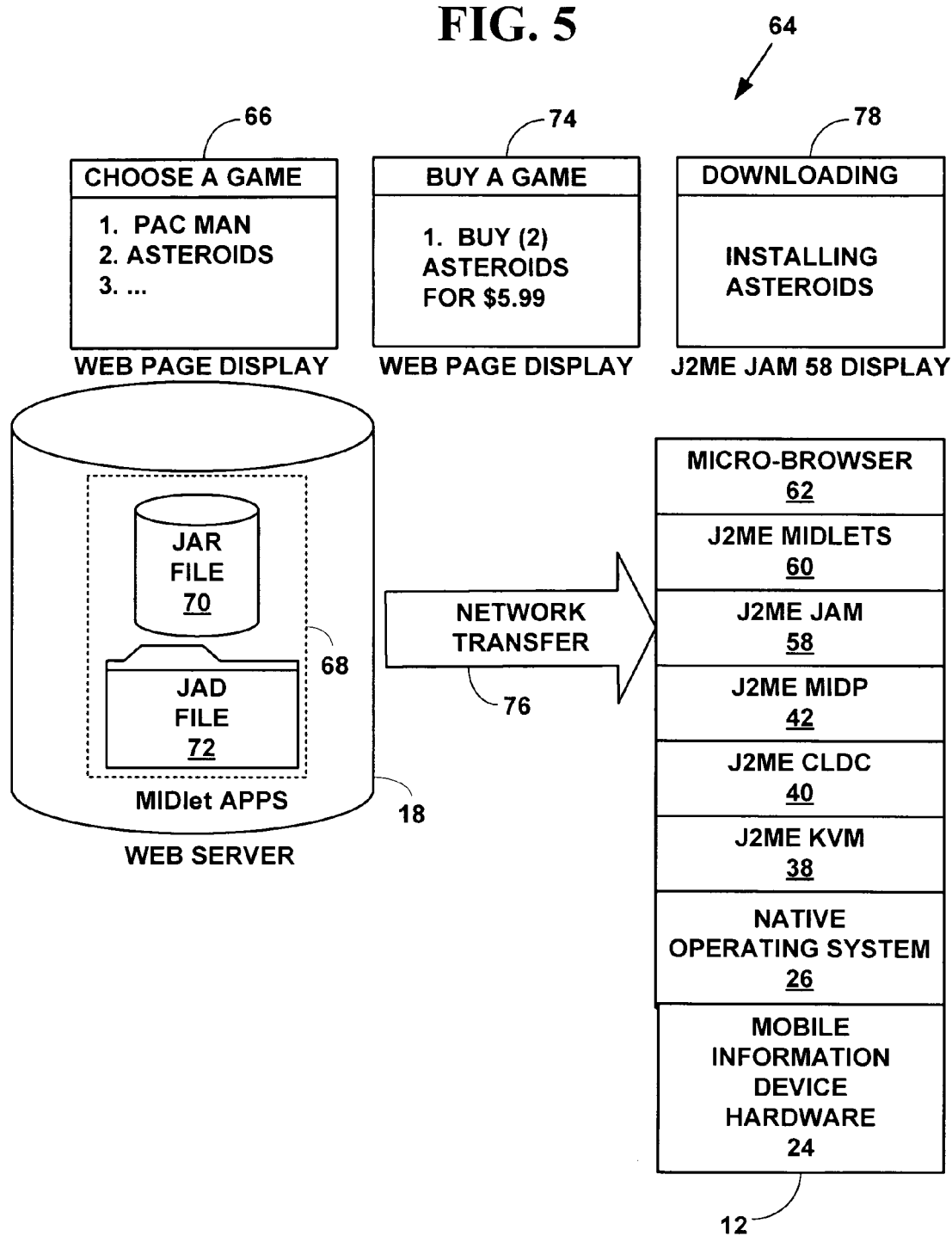
FIG. 5 is a block diagram illustrating an exemplary loading of a J2ME MIDlet onto a mobile information device.

FIG. 5 is a block diagram 64 illustrating an exemplary loading of a MIDlet onto a mobile information device. A user of a mobile information device 12 visits a Web page (or WAP page) 66 stored on a Web or WAP server 18 on the information network 20. The page lists MIDlets 68 (or MIDlet Suites) that are available for purchase and download.

As was discussed above individual MIDlets can be grouped together in a MIDlet Suite by creating JAR file 70 and an accompanying JAD file 72. The JAD file 72 includes information about the MIDlet application 68. For example, the JAD file 72 may include a version for the MIDlet application, a size of the MIDlet application, or other types of information.

If the mobile information device 12 already has the same version of the MIDlet 68, a user of the mobile information device 12 can be alerted to this fact so he/she doesn't buy it again. The JAR file 70 can also include the size of the actual MIDlet 68, so that if the mobile information device 12 only has 2K of space left and the MIDlet 68 is 6K in size, it can pop up a window saying that the device doesn't have enough room to download and store this MIDlet 68.

Once the user is ready to download the application 74 and the J2ME JAM 58 has confirmed that there is enough space, the JAM 58 downloads 76 the MIDlet 68. The JAM 58 typically displays the download status 78. The JAM 58 will save the MIDlet 68 on the device and then present it as a selection so that the user can launch and use the MIDlet.

MIDlet Execution

When a MIDlet is launched, the MIDlet enters the KVM 38 and life cycle methods of the MIDlet are invoked. Each MIDlet has a life cycle with a distinct series of states. The state of a MIDlet is controlled by the JAM 58 based on user interaction (e.g., key presses, etc.) or program-based notification (e.g., messages, time-outs).

Figure 6:
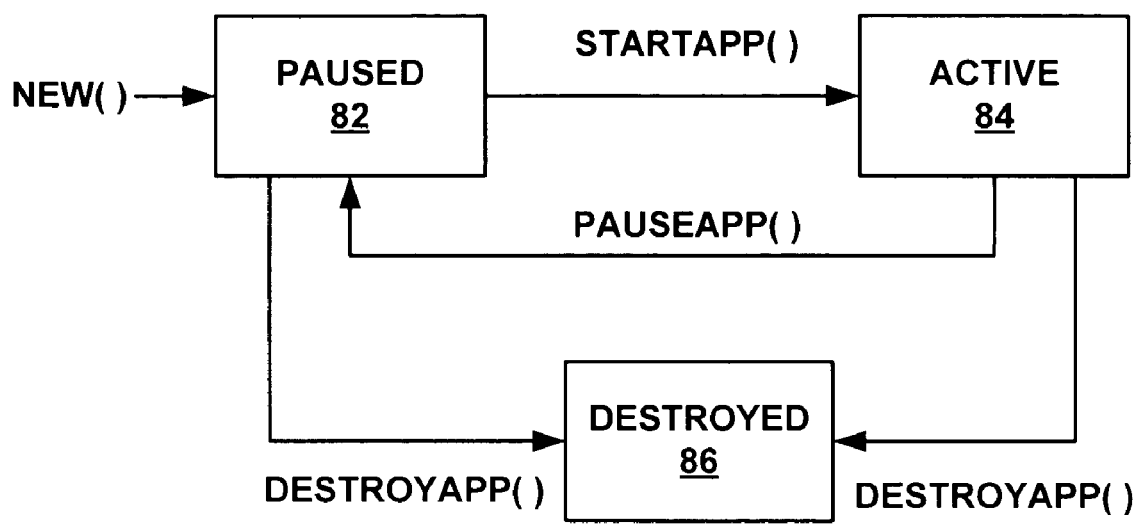
FIG. 6 is a block diagram illustrating states in a MIDlet life cycle.

FIG. 6 is a block diagram 80 illustrating states in a MIDlet life cycle. The MIDlet life cycle states include the paused state 82, the active state 84, and the destroyed state 86. Transitions from one state to another are defined by the J2ME MIDlet class as abstract methods. Table 2 illustrates exemplary abstract methods for MIDlet states.

TABLE 2

```
// Sample MIDlet
public class Sample extends MIDlet {
public Sample( ) {
}
public void startApp( ) throws MIDletStateChangeException {
}
public void pauseApp( ) {
}
public void destroyApp(boolean unconditional) {
}
```

Table 3 illustrates the MIDlet states and their corresponding description.

TABLE 3

| MIDlet State | Description |
| --- | --- |
| PAUSED | The MIDlet is initialized and is quiescent. It should not be holding or using any shared resources. This state is entered:<br>(1) After the MIDlet has been created using MIDlet.new( ). The public no-argument constructor for the MIDlet is called and returns without throwing an exception. The application typically does little or no initialization in this step. If an exception occurs, the application immediately enters the Destroyed state and is discarded;<br>(2) From the Active state after the MIDlet.pauseApp( ) method returns successfully; |

TABLE 3-continued

| MIDlet State | Description |
| --- | --- |
| | (3) From the Active state when the MIDlet.notifyPaused( ) method returns successfully to the MIDlet; and |
| | (4) From the Active state when the startApp( ) method throws a MIDlet state change exception. |
| ACTIVE | The MIDlet is functioning normally. This state is entered just prior to calling the MIDlet.startApp( ) method. |
| DESTROYED | The MIDlet has released all its resources and terminated. This state is entered: (1) When the MIDlet.destroyApp( ) method returns, except when the unconditional argument is false and a MIDlet state change exception is thrown. The destroyApp( ) method releases all held resources and performs any necessary cleanup so it may be garbage collected; and (2) When the MIDlet.notifyDestroyed( ) method returns successfully to the application. The MIDlet must perform the equivalent of the MIDlet.destroyApp( ) method before calling the MIDlet.notifyDestroyed( ) method. |

An exemplary MIDlet is shown in Table 4. This exemplary MIDlet prints a message in each of the MIDlet states.

TABLE 4

```
import javax.microedition.midlet.*;
public class PrintStateMIDlet extends MIDlet {
public void startApp( ) {
System.out.println("Hello From J2ME MIDlet . . . "); // ACTIVE STATE
System.out.println("In ACTIVE STATE . . . ");
pauseApp( );
}
public void pauseApp( ) {
System.out.println("In PAUSED STATE . . . "); // PAUSED STATE
destroyApp(true);
}
public void destroyApp(boolean unconditional) {
System.out.println("In DESTROYED STATE . . . "); // DESTROYED STATE
}
} // End PrintStateMIDlet
```

In current versions of J2ME, only one MIDlet can be active at a time on the mobile information device 12. A MIDlet is run in a foreground mode (or is paused). If the mobile information device 12 needs to process events requiring user interaction, the current MIDlet's execution is paused.

The original security model provided by the Java platform is known as the "sandbox model," which existed in order to provide a very restricted environment in which to run untrusted code obtained from the open network 20. The essence of the sandbox model is that local code (e.g., applets stored on a device) was trusted to have full access to vital system resources (such as the file system or data) while downloaded remote code is not trusted and can access only the limited resources provided inside the sandbox.

In the new Java 2 Platform Security Architecture, there is no longer a built-in concept that all local code is trusted. Instead, new local code (e.g., MIDlets downloaded from the network 20 and installed on the local file system) is subjected to the same security control as non-local code in the original security model.

For security reasons, it is assumed that MIDlets within a MIDlet Suite packaged together are able interoperate. MIDlets within a MIDlet Suite are able to interoperate because they share the same name space. Since they share the same name space, the MIDlets in a MIDlet Suite can launch one another. In the current version of J2ME one MIDlet Suite currently cannot launch MIDlets in another MIDlet Suite or share data with MIDlets in another MIDlet Suite because they do not share the same name space.

The MIDP specification also does not define how one MIDlet can launch another MIDlet or act as a handler for another MIDlet or non-MIDlet application. The MIDP specification indicates that launching a MIDlet Suite is solely the responsibility of the JAM 58.

Extending MIDlets

To allow MIDlets in one MIDlet Suite to exchange or share data with MIDlets in another MIDlet Suite or with non-MIDlet applications, a new object-oriented application program interface is provided. This new object-oriented application program interface includes multiple object-oriented object classes with multiple object-oriented methods.

The object-oriented application program interface includes multiple object-oriented object classes to allow input and output data to be communicated between J2ME MIDlets in different MIDlet Suites and MIDlets and non-MIDlet applications. The object-oriented application program interface is stored on a computer readable medium. The object-oriented application program interface includes at least a first object-oriented object class and a second-object oriented class, each with one or more object-oriented methods.

The first object-oriented class accepts input data in a MIDlet in a MIDlet Suite from an application management system on a mobile information device when the MIDlet is invoked on the mobile information device. The input data is generated by another MIDlet in another MIDlet Suite (or by another non-MIDlet application).

The second object-oriented object class for sets output data from a MIDlet in a MIDlet Suite when the MIDlet is terminated on a mobile information device. The output data is available to an application management system on the mobile information device and can be used by other MIDlets in other MIDlet Suites, or by non-MIDlet applications.

In one embodiment of the present invention, the object-oriented application program interface is a J2ME API 88. However, the present invention is not limited to this exemplary J2ME API and other J2ME APIs with other monikers can also be used.

FIG. 7 illustrates the exemplary API 88. This API 88 includes a System object class 90 and a Muglet object class 92. However, the present invention is not limited to this embodiment and other embodiments with more or fewer object classes can also be used. In addition, the API 88 and the object-classes included therein can use any monikers and are not limited to the monikers described.

One type of data that can be passed between MIDlets from different MIDlet Suites or other non-MIDlet applications, is a Uniform Resource Identifier ("URI"). However, the present invention is not limited to passing URI data between MIDlets and other types of data can also be used.

As is known in the art a URI is a generic term for all types of identifiers that refer to objects on the Internet. In J2ME, URI( ) is a string that is designed to handle the parsing of URIs and provide access to the various components (scheme, host, port, userinfo, path, query string and fragment).

At the highest level a URI reference (hereinafter "URI string") in string form has the syntax [scheme:]scheme-specific-part[#fragment], where square brackets "[ . . . ]" delineate optional components and the characters colon (":") and pound ("#") delineate other components. An absolute URI specifies a scheme; a URI that is not absolute is said to be relative. URIs are also classified according to whether they are "opaque" or "hierarchical".

An opaque URI is an absolute URI whose scheme-specific part does not begin with a slash character ("\"). Opaque URIs are not subject to further parsing. Some examples of opaque URIs are illustrated in Table 5.

TABLE 5 news:comp.lang.j2me //news

A hierarchical URI is either an absolute URI whose scheme-specific part begins with a slash character ("\") or a relative URI, that is, a URI that does not specify a scheme. A hierarchical URI is subject to further parsing. Table 6 illustrates a few examples of hierarchical URIs.

TABLE 6 docs/guide/collections/j2me
../../../sprint/demo/j2me
file:/../~calendar

Parsing of a URI string with the URI( ) object class is done according to the URI syntax described in IETF-RFC 2396, incorporated herein by reference. Every URI consists of a scheme, followed by a colon (":"), followed by a scheme-specific part. For URIs that follow the "generic URI" syntax, the scheme-specific part begins with two slashes ("\\") and may be followed by an authority segment (comprised of user information, host, and port), path segment, query segment and fragment.

For URIs that do not follow the "generic URI" syntax, the entire scheme-specific part is treated as the "path" portion of the URI. Unlike the java.net.URL class, the J2ME URI( ) string does not provide any built-in network access functionality nor does it provide any scheme-specific functionality (for example, it does not know a default port for a specific scheme). Rather, it only knows the grammar and basic set of operations that can be applied to a URI string.

Another description of data that can be passed to and from MIDlets is a Multipurpose Internet Mail Extension ("MIME") media type definition for text, audio, video, images, applications, etc. MIME media descriptions used in URIs are described in IETF-RFCs 2045, 2046 and 2047, incorporated by reference. Other descriptions of Internet media types can also be used for the data that is passed to and from MIDlets, and the present invention is not limited to URIs or MIME descriptions.

Returning to FIG. 7, the exemplary System object class 90 includes two object methods: (1) appendReferringURI( ); and (2) setExitURI( ). However, the present invention is not limited to these object methods and more fewer or other object methods can also be used in the exemplary System object class 90. For example, in one exemplary embodiment, the System object class 90 implements only the setExitURI( ) and not the appendReferringURI( ). In addition, the present invention is not limited to the monikers used, or object-functionality described for the System object class 90. Other monikers and more, fewer, or other object-functionality can also be used.

The object-method appendReferringURI( ) sets a string that is passed to the JAM 58 and appended to the URI identifying a MIDlet, when the MIDlet invokes another MIDlet or another application through the setExitURI( ) object method. The object method setExitURI( ) sets a URI that is passed to the JAM 58 and invoked according to the rules of URI scheme and Internet media type processing.

Details of the exemplary System object class 90 are illustrated in Table 7. However, the present invention is not limited to the implementation details described for exemplary System object class 90 and other implementation details can also be used.

TABLE 7

| Public class System<br>Extends java.lang.Object<br>Methods inherited by System( ) from class<br>java.lang.Object:<br>(clone, equals, finalize, getClass, hashCode, notify, notifyAll,<br>toString, wait, wait, wait)<br>Public System( ) | System Object Class 90<br>Object Methods Summary |
|---|---|
| public static void<br>appendReferringURI(java.lang.String<br>appendText) | Sets a string which is passed to the JAM 58 and appended to the URI identifying the MIDlet when the MIDlet invokes another application through the setExitURI( ) method. A zero-length string or null will result in the base URI for the MIDlet being the referring URI when setExitURI( ) is called.<br>Parameters:<br>appendText - The text string to be appended to the referring URI |
| public static void<br>setExitURI(java.lang.String exitURI) | Sets a URI that is passed to the JAM 58 and invoked according to the rules of scheme and media type processing. Any path may be set; a zero-length string or null disables the exit-URI functionality. Defaults to null.<br>Parameters:<br>exitURI - URI invoked after application exits |

Returning again to FIG. 7, the exemplary Muglet object class 92 includes four object methods: (1) getMediaType( ); (2) getMuglet( ); (3) getReferringURI( ); and (4) getURI( ). However, the present invention is not limited to these object methods and more fewer or other object methods can also be used in the Muglet object class 92. In addition, the present invention is not limited to the monikers used or object-functionality described for the Muglet object class 92. Other monikers and more or other object-functionality can also be used.

The object method getMediaType( ) returns a string including an Internet media type (e.g., a MIME type) of an object when a Muglet is invoked. When a Muglet is invoked to handle a URI scheme, this object-method returns null. The object method getMuglet( ) returns a Muglet instance associated with the invocation of a MIDlet. The object method getReferringURI( ) returns a string including the URI of a Web/WAP page or another Muglet that referenced an object resulting in the invocation of a Muglet to handle an Internet media type or identification of another MIDlet. The object-method getURI( ) returns a string including a temporary name that may be passed to another object-method (e.g., J2ME Connector.open( )) in order to access an object when the Muglet describes one (e.g., when getMediaType( ) returns a string).

Details of the exemplary Muglet object class 92 are illustrated in Table 8. However, the present invention is not limited to the implementation details described for exemplary Muglet object class 92 and other implementation details can also be used.

TABLE 8

| Public class Muglet Extends java.lang.Object Methods inherited by Muglet( ) from class java.lang.Object: (clone, equals, finalize, getClass, hashCode, notify, notifyAll, toString, wait, wait, wait) Public Muglet( ) | Muglet Object Class 92 Object Methods Summary |
|---|---|
| public static Muglet getMuglet( ) | Return the Muglet instance associated with the invocation of this MIDlet. If this MIDlet was invoked as a Muglet scheme and media-type handler, a single instance is created and the same instance is returned each time this method is invoked. If this MIDlet was not invoked as a Muglet, no instance is created and null is returned. Returns: Null if MIDlet not invoked as a Muglet, otherwise the single instance of Muglet. |
| public java.lang.String GetContentType( ) | Returns a string including the content type of an object when a Muglet is invoked; when a Muglet is invoked to handle a URI scheme, this method returns null. Returns: Null if Muglet is invoked to handle a URI scheme. |
| public java.lang.String GetMediaType( ) | Returns a string including the Internet media type of an object when a Muglet is invoked; when a Muglet is invoked to handle a URI scheme, this method returns null. Returns: Null if Muglet is invoked to handle a URI scheme. |

TABLE 8-continued

| public java.lang.String getURI( ) | Returns a string including a temporary name which may be passed to Connector.open( ) in order to access an object when the Muglet describes one (when getMediaType( ) returns a string). When no object is present and the Muglet has been invoked as a scheme handler, the full URI, including scheme, is returned. This method does not return null. Returns: A string including a URI or path name. |
|---|---|
| public java.lang.String getReferringURI( ) | Returns a string including the URI of a web/wap page that referenced an object resulting in the invocation of a Muglet to handle an Internet media type. If no referring URI exists for any reason, this method returns null. Returns: A string including a URI or a null. |

A method of the invention includes passing input data to a first Java MIDlet in a first MIDlet suite on a mobile information device. Passing the input data to the first Java MIDlet includes (i) receiving from the first Java MIDlet a request for the input data via at least one of getMediaType( ), getContentType( ), getMuglet( ), getReferringURI( ), and getURI object-oriented methods, and (ii) responsively passing the input data to the first Java MIDlet. Another method of the invention includes passing the input data to a second Java MIDlet. Passing the input data to the second Java MIDlet includes: (i) receiving from the second Java MIDlet a request for the input data via at least one of getMediaType( ), getContentType( ), getMuglet( ), getReferringURI( ), and getURI( ) object-oriented methods, and (ii) responsively passing the input data to the second Java MIDlet.

Setting Output Data From MIDlets

Figure 8:
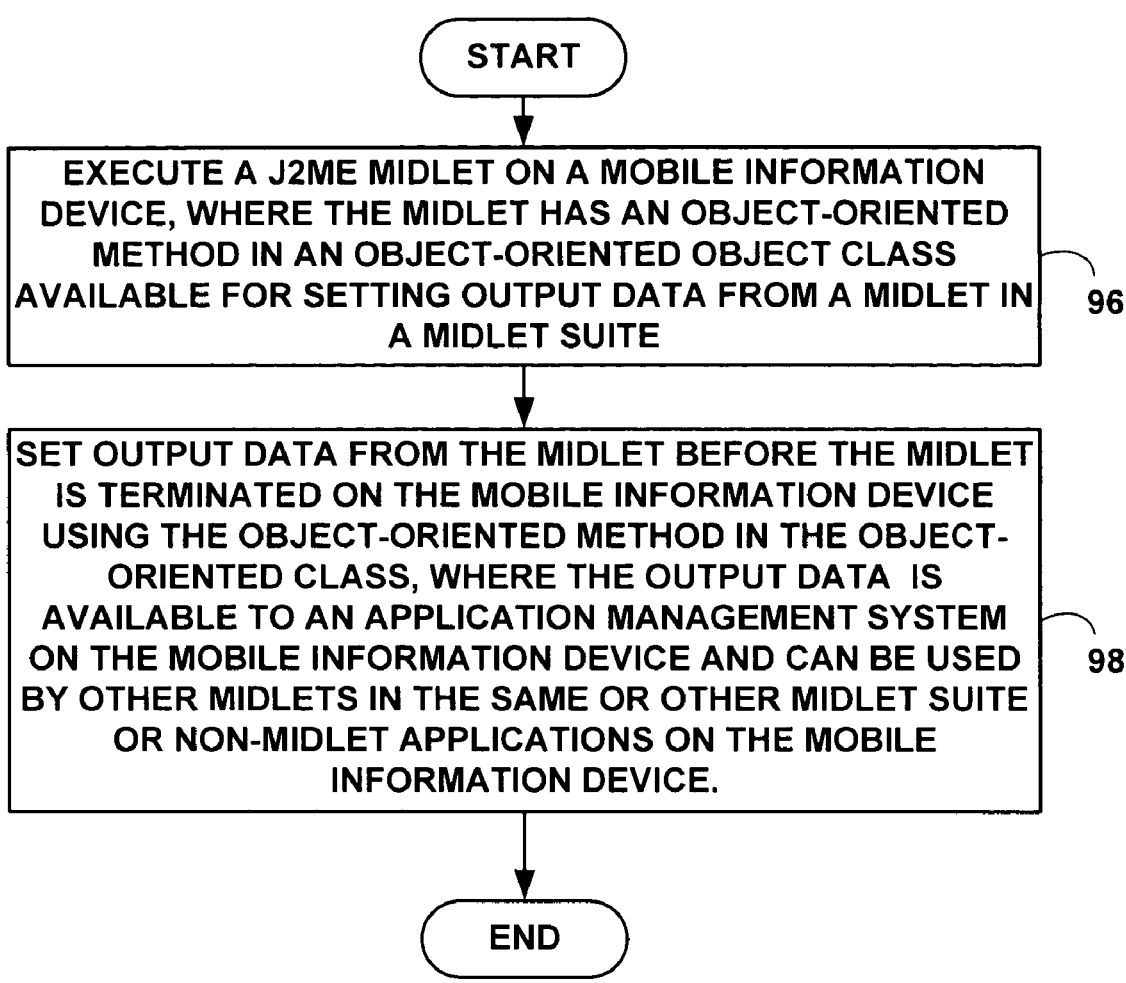
FIG. 8 is a flow diagram illustrating method for exchanging output data between portable applications on a mobile information device.

FIG. 8 is a flow diagram illustrating Method 94 for exchanging output data between portable applications on a mobile information device. At Step 96, a J2ME MIDlet is executed on a mobile information device. The MIDlet has an object-oriented method in an object-oriented object class available for setting output data from a MIDlet in a MIDlet suite. At Step 98, output data is set from the MIDlet before the MIDlet is terminated on the mobile information device using the object-oriented method in the object-oriented class. The output data is available to an application management system on the mobile information device and can be used by other MIDlets in the same or other MIDlet Suites or non-MIDlet applications on the mobile information device.

Method 94 may further comprise appending an identifier for the MIDlet to the generating referring URI. The identifier is used by another MIDlet or another non-MIDlet application invoked by the MIDlet to identify the MIDlet. For example, it may be used to identify the MIDlet that set the output data.

Method 94 is illustrated with an exemplary embodiment. However, the present invention is not limited to this embodiment and other embodiments can also be used to practice the invention. In such an exemplary embodiment at Step 96, a J2ME MIDlet is executed on the mobile information device 12. The MIDlet has the setExitURI( ) object-oriented method from the System( ) 90 object class available for setting output data including URI strings.

At Step 98, output data including a URI string is set from the MIDlet before the MIDlet is terminated on the mobile information device 12 using the setExitURI( ) object-oriented method. The output data is available to the JAM 58 on the mobile information device 12. The JAM 58 makes the output data available to other MIDlets in the same or another MIDlet suite or other non-MIDlet applications.

The "Exit URI" functionality of the exemplary System object class 90 allows a MIDlet to tell the JAM 58 to access a specific URI upon exit from the MIDlet. The MIDlet may set the exit URI at any time during its execution, and may change the exit URI as many times as necessary during its execution. If the MIDlet exits on its own (i.e., by calling notifyDestroyed instead of being killed by the JAM 58 calling destroyApp( ), the JAM 58 will access the URI provided by the MIDlet.

Method 94 may further comprise appending a string identifier for the MIDlet to the generating referring URI. The string identifier is used by another MIDlet or another non-MIDlet application invoked by the MIDlet to identify the invoking MIDlet. The "referring URI string" functionality can also be used by a MIDlet in conjunction with the "Exit URI" functionality.

Using Input Data Set by MIDlets

Figure 9:
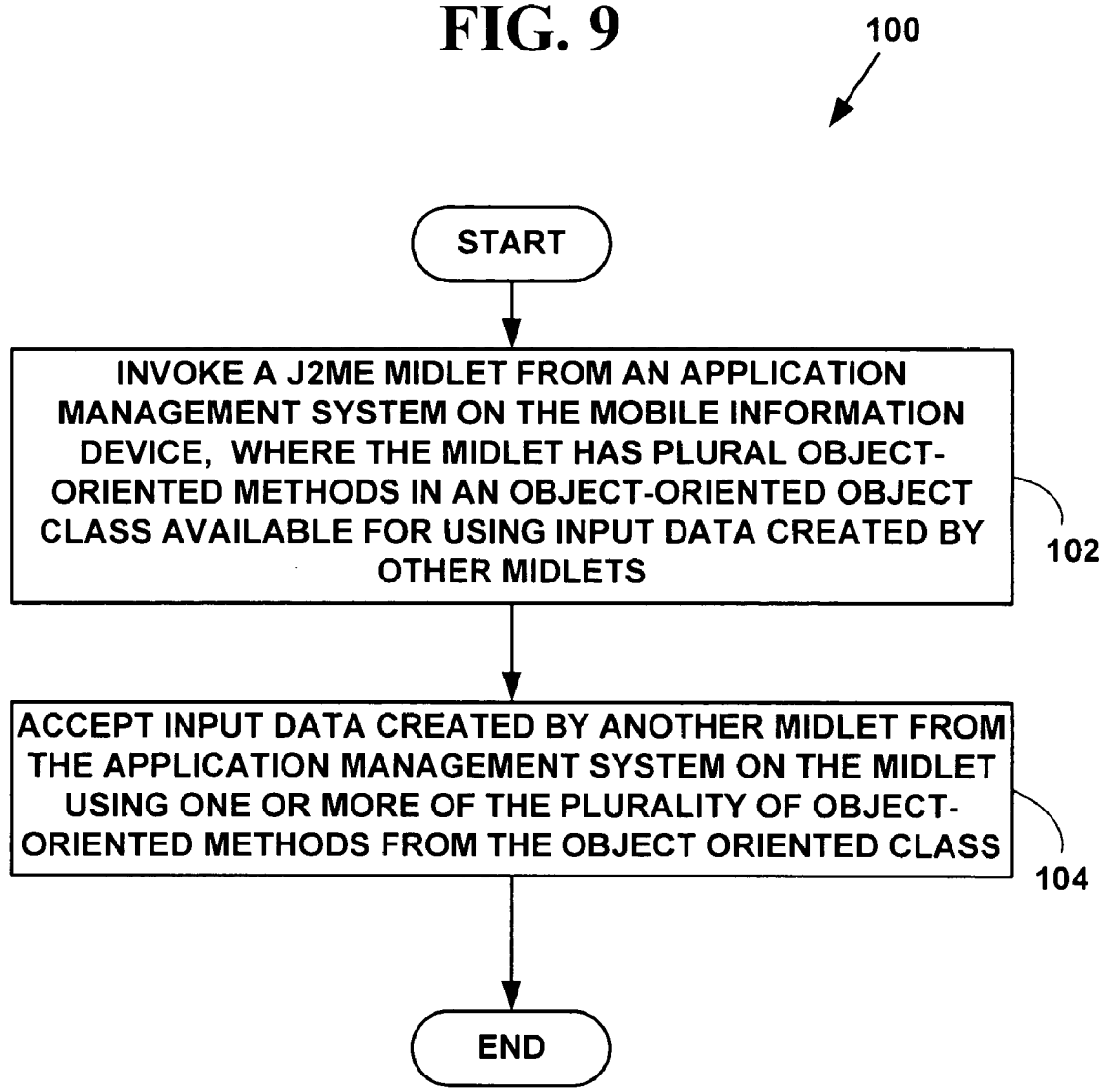
FIG. 9 is a flow diagram illustrating a method for using input data on portable applications on a mobile information device.

FIG. 9 is a flow diagram illustrating a Method 100 for using input data on portable applications on a mobile information device. At Step 102, a J2ME MIDlet is invoked on from an application management system on the mobile information device. The MIDlet has plural object-oriented methods in an object-oriented object class available for using input data created by other MIDlets. At Step 104, input data created by another MIDlet is accepted from the application management system on the MIDlet using one or more of the plural object-oriented methods from the object oriented class.

Method 100 is illustrated with an exemplary embodiment. However, the present invention is not limited to this embodiment and other embodiments can also be used to practice the invention. In such an exemplary embodiment at Step 102, a J2ME MIDlet is invoked on the mobile information device 12 from the JAM 58. The MIDlet has the four object-oriented methods from the Muglet 92 object class available for using input data including a URI scheme or an Internet media type (e.g., MIME type) created by other MIDlets. At Step 104, input data including a URI scheme or an Internet media type created by another MIDlet or a non-MIDlet application is accepted from the JAM 58 on the MIDlet using one or more of the object-oriented methods from Muglet 92 object class.

Figure 10:
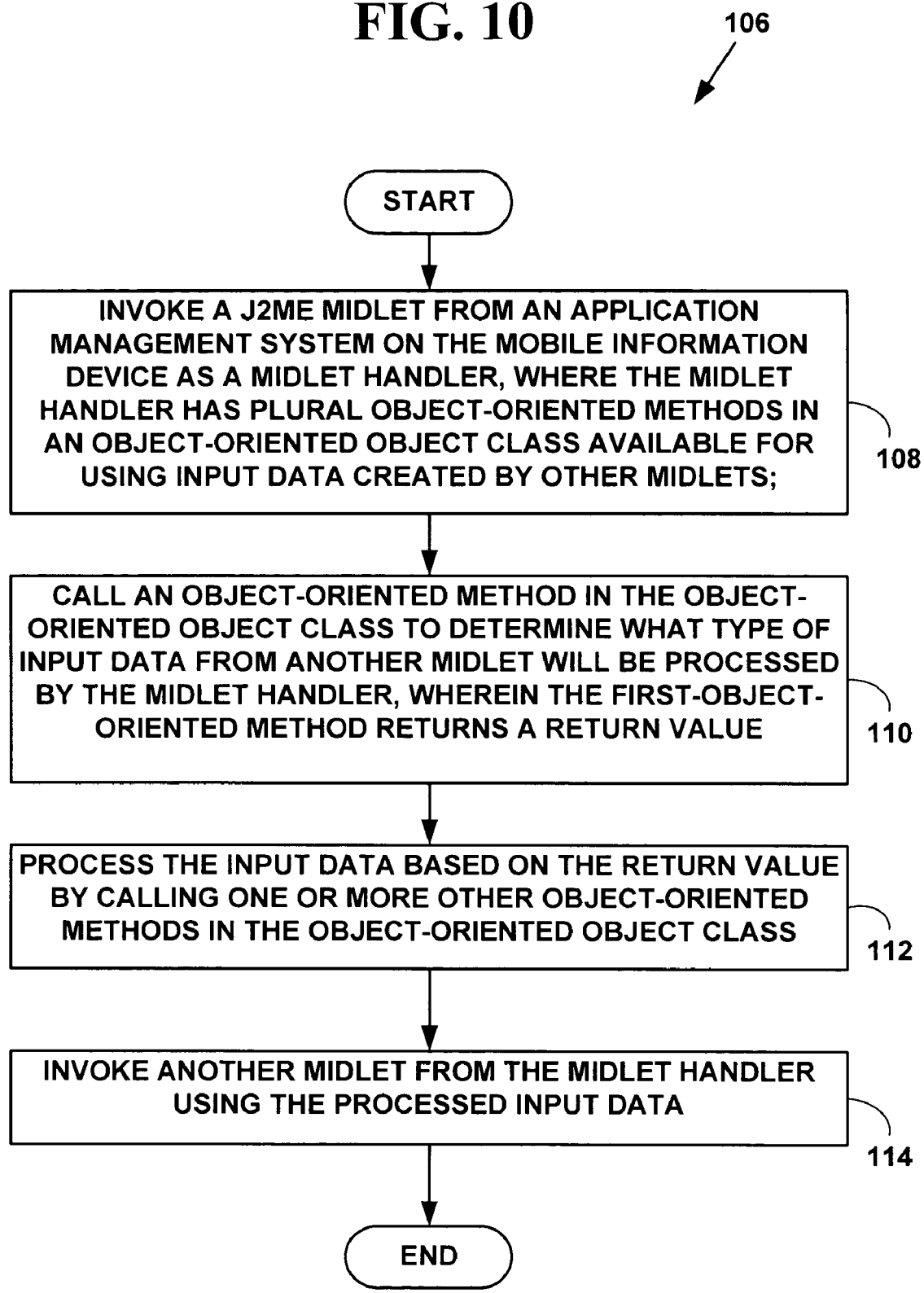
FIG. 10 is a flow diagram illustrating a method for invoking a MIDlet as a MIDlet handler.

FIG. 10 is a flow diagram illustrating a Method 106 for invoking a MIDlet as a MIDlet handler. At Step 108, a J2ME MIDlet is invoked from an application management system on the mobile information device as a MIDlet handler. The MIDlet handler includes plural object-oriented methods in an object-oriented object class available for using input data created by other MIDlets. Step 110, an object-oriented method in the object-oriented object class is called from the MIDlet handler to determine what type of input data will be processed by the MIDlet handler. The object-oriented method returns a return value. At Step 112, the input data is processed based on the return value by calling one or more other object-oriented methods in the object-oriented object class. At Step 114, another MIDlet is invoked from the MIDlet handler using the processed input data.

Method 106 is illustrated with an exemplary embodiment. However, the present invention is not limited to this embodiment and other embodiments can also be used to practice the invention. In such an exemplary embodiment at Step 108, a J2ME MIDlet is invoked from the JAM 58 on the mobile information device 12 as a Muglet acting as a MIDlet handler. The Muglet includes the plural object-oriented methods from the Muglet object class 92 that available for using input data such as URI schemes and Internet media types created by other MIDlets or other non-MIDlet applications.

A MIDlet intended to process one or more type of URI scheme or Internet media type can be invoked as a MIDlet handler via the Muglet object class 92. A Muglet is constructed as a standard MIDlet, and may make use of the full range of features available to MIDlets. Additionally, such a Muglet enumerates which URI schemes and Internet media types are handled by including certain properties in a corresponding MIDlet Suite. When installed into a mobile information device 12, MIDlet Suite properties are used to configure the Muglet(s) to handle the specified URI schemes and Internet media types for other MIDlets and non-MIDlet applications on the mobile information device 12. Such a model may be similar to how common desktop web-browsers use 'plug-in' modules and external applications.

However, unlike plug-ins in the desktop web-browser environment, Muglet URI scheme and media type handlers do not run as extensions to a browser and do not have access to the browser context. Instead, Muglet URI scheme and media type handlers are independently-running applications.

Returning to FIG. 10, at Step 110, once invoked, a Muglet calls the GetMediaType( ) object method to determine what, if any, URI scheme or media type triggered execution of the Muglet.

Returned from the GetMediaType( ) object method is string that specifies a type and value of a URI scheme or Internet media type. In addition, a name can be provided in the case of an Internet media type that provides access to an actual object (e.g., via the J2ME Connector.openInputStream( ) object method).

At Step 112, the URI scheme or Internet Media Type is processed based on the return value of the GetMediaType( ) object method by calling one or more other object-oriented methods including getURI( ), getReferringURI( ) or getMuglet( ) in Muglet object class 92.

If a Muglet is invoked to handle a scheme or media type which is not recognized, the Muglet may exit immediately. It is possible to build a Muglet that runs as a URI scheme and Internet media type handler when invoked as such, and otherwise runs as a conventional MIDlet.

At Step 114, another MIDlet is invoked from the MIDlet handler using the processed input data. As is the case with standard J2ME MIDP implementation, only one MIDlet or non-MIDlet applications runs at any one time in the mobile information device 12, and there is no facility to have more than one Muglet URI scheme or Internet media type handler running at the same time.

In one embodiment, when a Muglet is invoked to handle a URI scheme or Internet media type, a MIDlet or non-MIDlet application being executed is suspended for the duration of the Muglet execution. Once the Muglet execution is complete, the invoking MIDlet or non-MIDlet application is resumed. It is possible, however, that the invoked application may itself use the Muglet functionality to exit to another application instead of returning to the original invoking application. This can cause the original invoking application to remain in a perpetually suspended state, thereby causing hanging system resources. Thus, in another embodiment, a MIDlet or non-MIDlet application must exit in order to call a Muglet.

Once invoked, a Muglet URI scheme or Internet media type handler has complete control over the interpretation of the URI scheme, Internet media type or object. Any errors in these items are handled as the Muglet desires.

A Muglet may also receive a referring URI string via the getReferringURI( ) object-oriented method from the Muglet object class 92. This URI string indicates the application or URL location from which the Muglet was invoked, and may be used by the Muglet as an exit URI when it terminates, so that control can be returned to a previous context.

For example, if a Muglet is invoked from a Web page as an Internet media type handler, it could set the exit URI string to the value of the incoming referring URI string, such that the mobile information device 12 would be returned to the same Web page being viewed when the Muglet exits. If the Muglet chooses to exit to another URI string or to no URI string, it may discard the referring URI string.

Jam Support for Exchanging Input and Output Data

In one embodiment of the present invention, the JAM 58 is built around the concept of a registry. The registry maintains information about what MIDlets or non-MIDlet applications are invoked to handle specific media types and URI schemes. The registry may include both MIDlet and non-MIDlet applications.

When a J2ME MIDlet is installed by the JAM 58, the JAD file 72 may specify content types that are handled by a MIDlet through one or more instances of a Content-<n>-Handler attribute as described below. A user of a mobile information device 12 is prompted to confirm the registration of the MIDlet as a scheme or media type handler. If there is already a handler registered for that scheme or media type, the user may be prompted to confirm the replacement or keep the existing handler registration.

The handler type and URI scheme or Internet media type name for an "n-th MIDlet" in a MIDlet Suite is specified as comma-separated strings. A handler type currently includes "uri-scheme" or "media-type". However, the present invention is not limited to these handler types and more or other handler types can also be used. Table 9 indicates exemplary handler type examples.

TABLE 9

| Handler type Example | Description |
| --- | --- |
| Content-1-Handler: uri-scheme, mailto | A MIDlet that provides an enhanced email handler. |
| Content-2-Handler: media-type, image/gif | A MIDlet that provides a viewer for Graphic Interchange Format ("GIF") files. |

Any properties in the MIDlet Suite specifying URI scheme or Internet media type handlers should also be present a corresponding JAD file 72. If the JAM 58 determines that any of the Internet media types and/or URI schemes that the JAD file 72 is attempting to register cannot be registered (e.g., because they are protected media types or URI scheme), the JAM 58 will not download the JAR file 70, and will post a response with a "906 Invalid Descriptor" error code. More information on how MIDlet suites can be deployed over-the-air ("OTA") may be found in the "Over The Air User Initiated Provisioning Recommended Practice for the Mobile Information Device Profile," version 1.0, dated May 7, 2001, which is incorporated herein by reference.

When the JAM 58 receives a URI string to process, it determines the appropriate application to handle the corresponding URI scheme based on the registry entries. There are several sources of URI's that the JAM 58 handles, including URI strings from: (1) an exit URI from a MIDlet set by setExitURI( ); (2) a micro-browser; (3) a push message (e.g., Service Indication or Service Loading messages); or (4) native non-MIDlet applications.

Table 10 shows an example list of predefined URLs and their corresponding mappings. A Muglet implementation may includes a greater or fewer number of predefined URL mappings, and it may include URL mappings other than those listed in Table 10. Other URL schemes can be handled by an installed a MIDlet that implements the Muglet object class 92.

TABLE 10

| Scheme | Scheme Handling |
| --- | --- |
| http: https: | Launch mirco-browser 62 and get an indicated URL. |
| midlet: | Launch a specified MIDlet. |
| arms: | Launch specified content. |
| tel: | Place a phone call to the indicated phone number. (See IETF-REC 2806, incorporated herein by reference). |
| im: | Invoke a native instant messaging client application. |

When the JAM 58 invokes a MIDlet as a Muglet (e.g., as a URI scheme or Internet media type handler), it passes in the referring URI string to the Muglet, if available. If the Muglet was invoked from a link or content on a browser page, the URL of the page is used as the referring URI. If the Muglet was invoked due to an exit URI from another MIDlet, the JAM 58 appends a string provided by the exiting MIDlet to the Muglet using the appendReferringURI( ) object oriented method, and the Muglet uses the resulting URI as the referring URI. If a Muglet is invoked due to the user selecting it to handle stored content that the user selects to view, or due to a URI string in a notification, the referring URI string will be null.

A URI scheme allows another MIDlet to be specifically identified by other MIDlet and non-MIDlet applications. The scheme specific portion of the MIDlet URI includes fully qualified class name of a class that extends MIDlet (e.g., Muglet), and may refer to a specific MIDlet within a MIDlet Suite. The URI string may also include a query component that with parameters for a MIDlet by including a question mark ("?") and a series of URL-encoded parameters after the fully qualified class name.

The entire URI scheme will be passed to the Muglet by the JAM 58 via the Muglet.getURI( ) object-oriented method. For example, a URI string including "midlet:com.sprintpcs.apps.calendar?date="20011003" would launch a calendar MIDlet from "com.sprintpcs.apps" with the date set to Oct. 3, 2001, from a Muglet.

The JAM 58 also supports the ability to "launch" stored non-java content by handling URI string with a scheme of ("ams:") and a scheme-specific part that is a content-ID of the target content. For example, a URI string including "ams: sprintpcs.com.example_content" in a browser page would cause an ams: URI to be passed to the AMS, which would launch an appropriate handler for the stored content with a content-ID associated with "example_content."

If the JAM 58 encounters any URI that does not have a pre-defined handling requirement as described above in Table 10, it will attempt to locate a MIDlet that is registered to handle the scheme type using the registry. If such a MIDlet is located, the JAM 58 will launch the MIDlet and pass the URI string to the MIDlet through the Muglet.getURI( ) object-oriented method.

When the JAM 58 receives a content file to process, it will determine the appropriate application to handle that content-type based on the registry entries. There are at least three sources of content that the JAM 58 may need to handle, including: (1) "ams: content" stored content folders; (2) files downloaded by micro-browser 62; or (3) content from other native applications.

When a content type handled by a MIDlet is needs to be processed, the application that downloaded or generated the content passes both a content and a MIME or other Internet content-type to the JAM 58. The JAM 58 determines an appropriate Muglet (i.e., MIDlet handler) based on the registry, and launches the appropriate MIDlet.

The JAM 58 will pass the content-type to the Muglet through the Muglet.getContentType( ) object-oriented method, and will pass a locally significant URI string to the Muglet via the Muglet.getURI( ) method. When the Muglet passes this URI string to the J2ME Connector.open( ) object-oriented method, the JAM 58 will return a stream connection to a buffer that is holding the content.

The ability to invoke content, applications, services, downloads, etc. on the device from a push message is also supported. When a messaging client receives a WAP Service Indication ("SI") or Service Loading ("SL") message, the message may include a URI field. The handling of these messages is the responsibility of the messaging client, which will invoke the JAM 58 to handle the embedded URI scheme. Service Loading messages will cause the URI to be invoked without user intervention, and are generated from trusted carrier systems. Service Indication messages present text to the user, who can then elect to invoke the URI. In either case, the URI will be passed to the JAM 58 for handling.

A "protected MIDlet" is a J2ME application that is downloaded using Hyper Text Transfer Protocol—Secure ("HTTPS") from a trusted carrier domain. As is known in the art, HTTPS variation of HTTP that provides for encryption and transmission through a secure port. HTTPS allows HTTP to run over security mechanisms known as Secure Sockets Layer ("SSL") or Transport Layer Security ("TLS").

For a protected MIDlet, both the JAR 70 and JAD 72 files are downloaded via HTTPS from a trusted domain. When a MIDlet is protected, the JAM 58 enforces the following rules: (1) the MIDlet cannot be upgraded except from the trusted carrier domain; (2) no other application can register to handle any Internet media types or URI schemes that are handled by the protected MIDlet; and (3) only a user can delete a protected MIDlet from the JAM 58. When a user deletes the protected MIDlet, any Internet media types and URI schemes handled by that MIDlet are released, and can then be handled by other MIDlets or non-MIDlet application.

Exemplary Application Management System Operation

Figure 11:
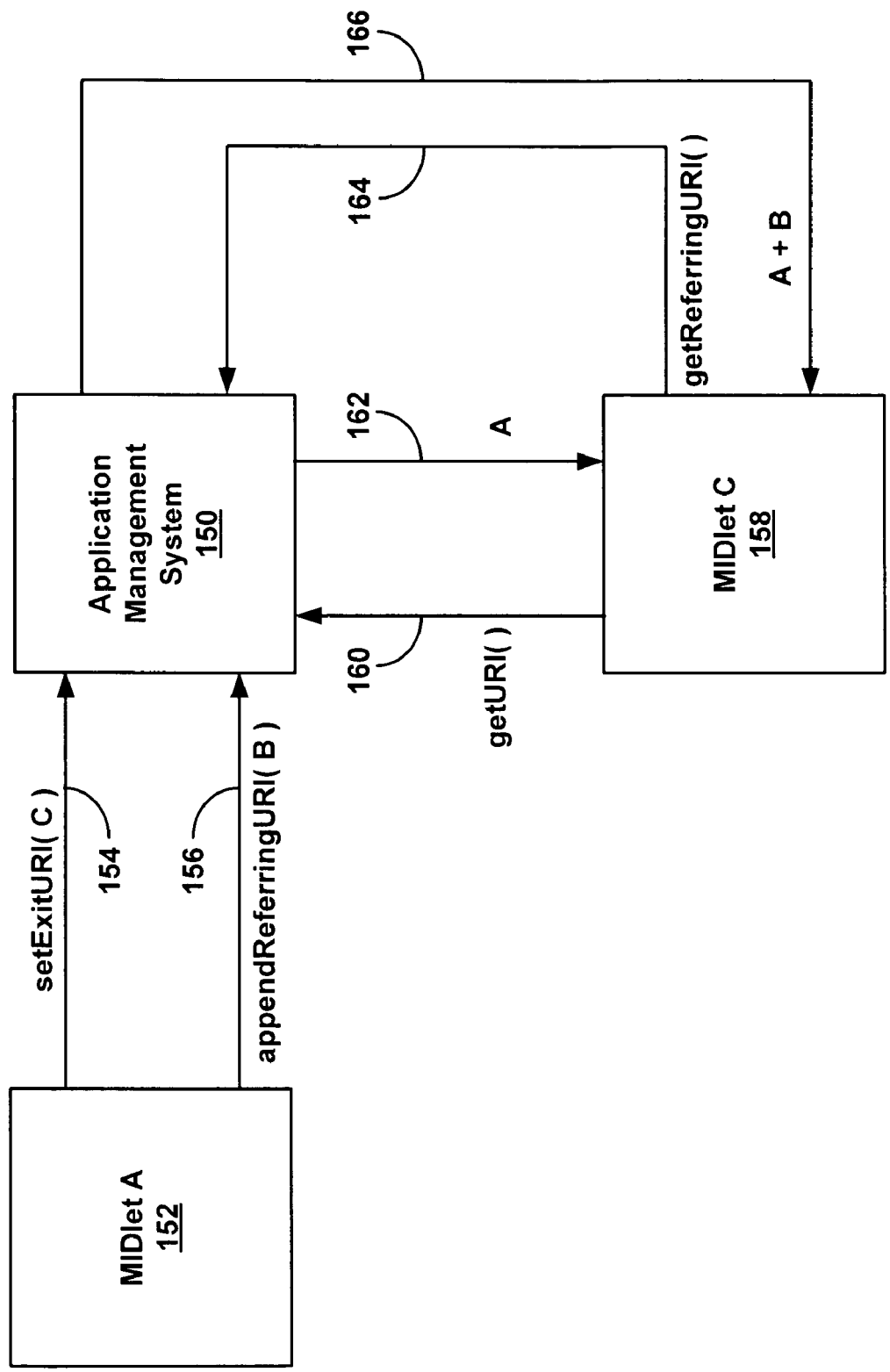
FIG. 11 is a block diagram illustrating an exemplary operation of an application management system.

FIG. 11 is a block diagram illustrating an exemplary operation of an application management system. An application management system 150 may execute, for example, on a mobile information device. The application management system 150 may control the operation of one or more other applications executing on the mobile information device. For example, the application management system 150 may control the operation of non-MIDlet applications, and the application management system 150 may control the operation of MIDlets in the same or different MIDlet suites.

As shown in FIG. 11, the application management system interfaces with MIDlet A 152, which currently executes on the mobile information device. Using the previously described object-oriented methods, MIDlet A 152 may pass data to the application management system 150. For example, MIDlet A 152 may use the setExitURI( ) object-oriented method to pass data to the application management system 150. At dataflow 154, MIDlet A 152 passes setExitURI(C) to the application management system 150. The parameter "C" passed to the application management system 150 may be, for example, a URI or a MIME media type. MIDlet A 152 may use the setExitURI( ) to invoke another MIDlet or non-MIDlet application.

MIDlet A 152 may optionally pass data to the application management system 150 using the appendReferringURI( ) object-oriented method. This may be used, for example, in conjunction with the setExitURI( ) object-oriented method. At dataflow 156, MIDlet A 152 passes appendReferringURI (B) to the application management system 150. The parameter "B" passed to the application management system 150 may be additional data that is appended to that data passed to the application management system 150 through the setExitURI( ) object-oriented method.

MIDlet A 152 may set output data using the setExitURI( ) and appendReferringURI( ) object-oriented methods, and MIDlet A 152 may set the output data before it terminates on the mobile information device. Once MIDlet A 152 terminates on the mobile information device, the application management system 150 may make the output data available to MIDlets in the same MIDlet suite, to MIDlets in different MIDlet suites or to non-MIDlet applications.

Once MIDlet A 152 terminates, the application management system 150 may determine which application is registered to handle the output data generated by MIDlet A 152. For example, the application management system 150 may check to determine an application registered to handle a scheme of the output data generated by MIDlet A 152. The application management system 150 may then launch the application that is registered to handle that scheme.

As shown in FIG. 11, the application management system 150 launches MIDlet C 158 to handle the output data set by MIDlet A 152. At dataflow 160, MIDlet C 158 uses the getURI( ) object-oriented method to obtain the output data set by MIDlet A 152. In response, the application management system 150 returns to MIDlet C 158 the "A" output data, shown generally by dataflow 162.

Depending on the type of output data set by MIDlet A 152, MIDlet C 158 may optionally use one or more of getMediaType( ), getContentType( ), getMuglet( ), getReferring( ) or other object-object oriented methods to obtain the output data set by MIDlet A 152. These may be used in conjunction with or in place of the getURI( ) object-oriented method shown at dataflow 160.

MIDlet C 158 may additionally use the getReferring URI( ) object-oriented method to obtain additional output data set by MIDlet A 152. The getReferringURI( ) object-oriented method can be used to obtain the output data set by MIDlet A 152 via the appendReferringURI( ) object-oriented method. At dataflow 164, MIDlet C 158 uses the getReferringURI( ) object-oriented method to obtain additional output data set by MIDlet A 152. In response to the getReferringURI( ) object-oriented method, and as shown at dataflow 166, the application management system 150 returns parameters "A" and "B" to MIDlet C 158. Parameter "A" identifies MIDlet A 152, which invoked MIDlet C 158. Parameter "B" is the additional data that MIDlet A 152 passed to the application management system 150 via the appendReferring URI( ) object-oriented method.

Many different variations may be made to the operation of the application management system 150. While FIG. 11 depicts the application management system 150 passing data between two different MIDlets, the application management system 150 may alternatively pass data between a MIDlet and a non-MIDlet application. For example, MIDlet A 152 might be replaced by a non-MIDlet application, such that the non-MIDlet application generates output data that the application management system 150 then passes to MIDlet C 158. In another example, MIDlet C 158 might be replaced by a non-MIDlet application, such that the application management system 150 receives output data from MIDlet A 152 that the application management system 150 passes to the non-MIDlet application.

Figure 12:
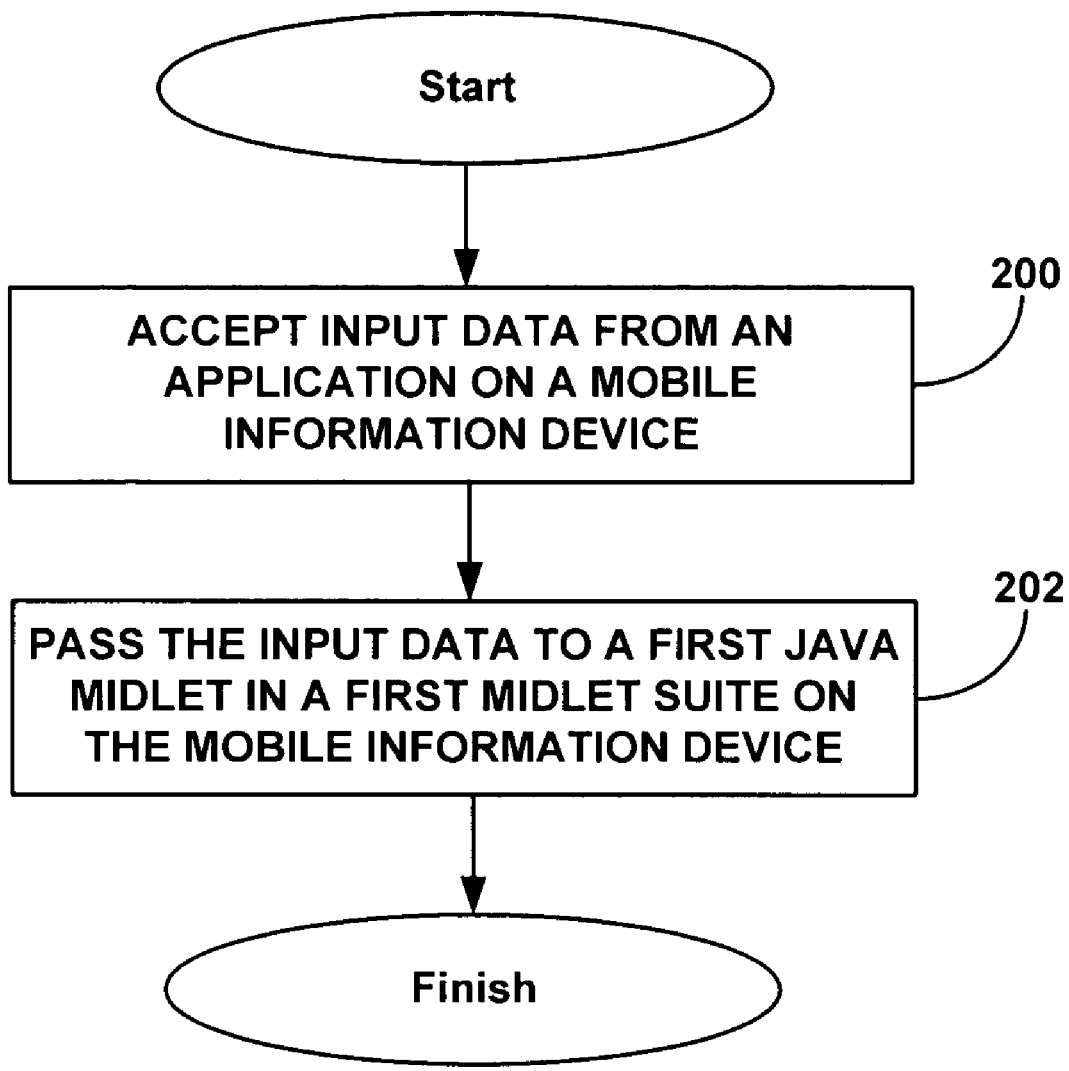
FIG. 12 is a flowchart of an exemplary process for an application management system to receive input data from an application and to pass the input data to a first Java MIDlet in a first Java MIDlet suite.

FIG. 12 is a flowchart of an exemplary process for an application management system to receive input data from an application and to pass the input data to a first Java MIDlet in a first Java MIDlet suite. At Step 200, the application management system accepts input data from an application on a mobile information device. In one embodiment, the application may be a non-MIDlet application. In another embodiment, the application may be a Java MIDlet.

Then, at Step 202, the application management system passes the input data to a first Java MIDlet in a first MIDlet suite on the mobile information device. Where the application that created the input data is a Java MIDlet, it may be in a different MIDlet suite than the first Java MIDlet. Thus, the application management system may use this method, for example, to receive input data from a MIDlet in one MIDlet suite and then pass the input data to a MIDlet in another MIDlet suite. Alternatively, the application management system may use this method to receive input data from a non-MIDlet application and then pass the input data to a MIDlet application.

Figure 13:
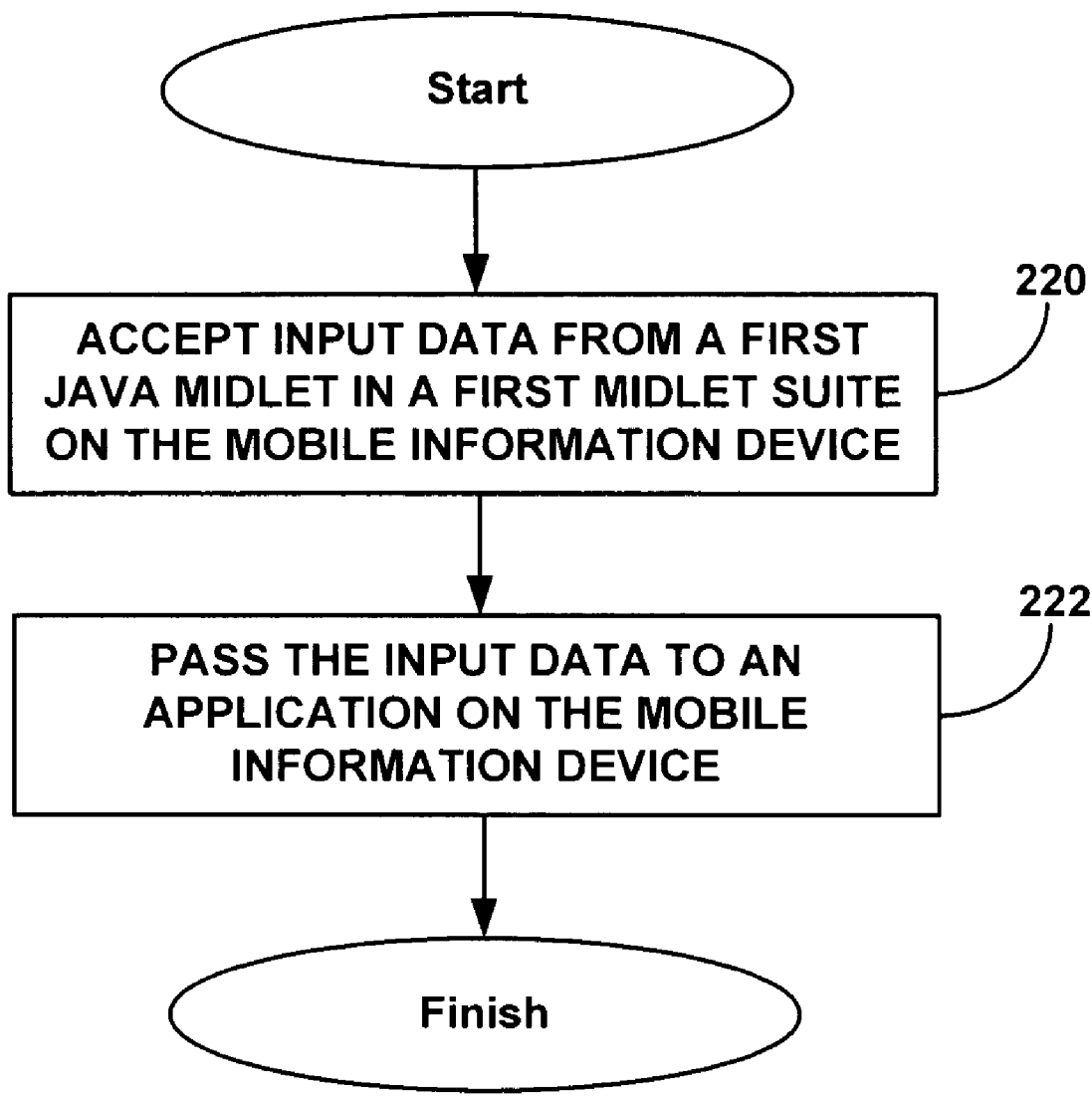
FIG. 13 is a flowchart of an exemplary process for an application management system to receive input data from a first Java MIDlet in a first MIDlet suite and to pass the input data to an application.

FIG. 13 is a flowchart of an exemplary process for an application management system to receive input data from a first Java MIDlet in a first MIDlet suite and to pass the input data to an application. At Step 220, the application management system accepts input data from a first Java MIDlet in a first MIDlet suite on the mobile information device. Thus, the input data to the application management system can be output from the first Java MIDlet. Then, at Step 222, the application management system passes the input data to an application on the mobile information device. The application may be, for example, a Java MIDlet in a different MIDlet suite than the first Java MIDlet, or the application may be a non-MIDlet application.

Figure 14:
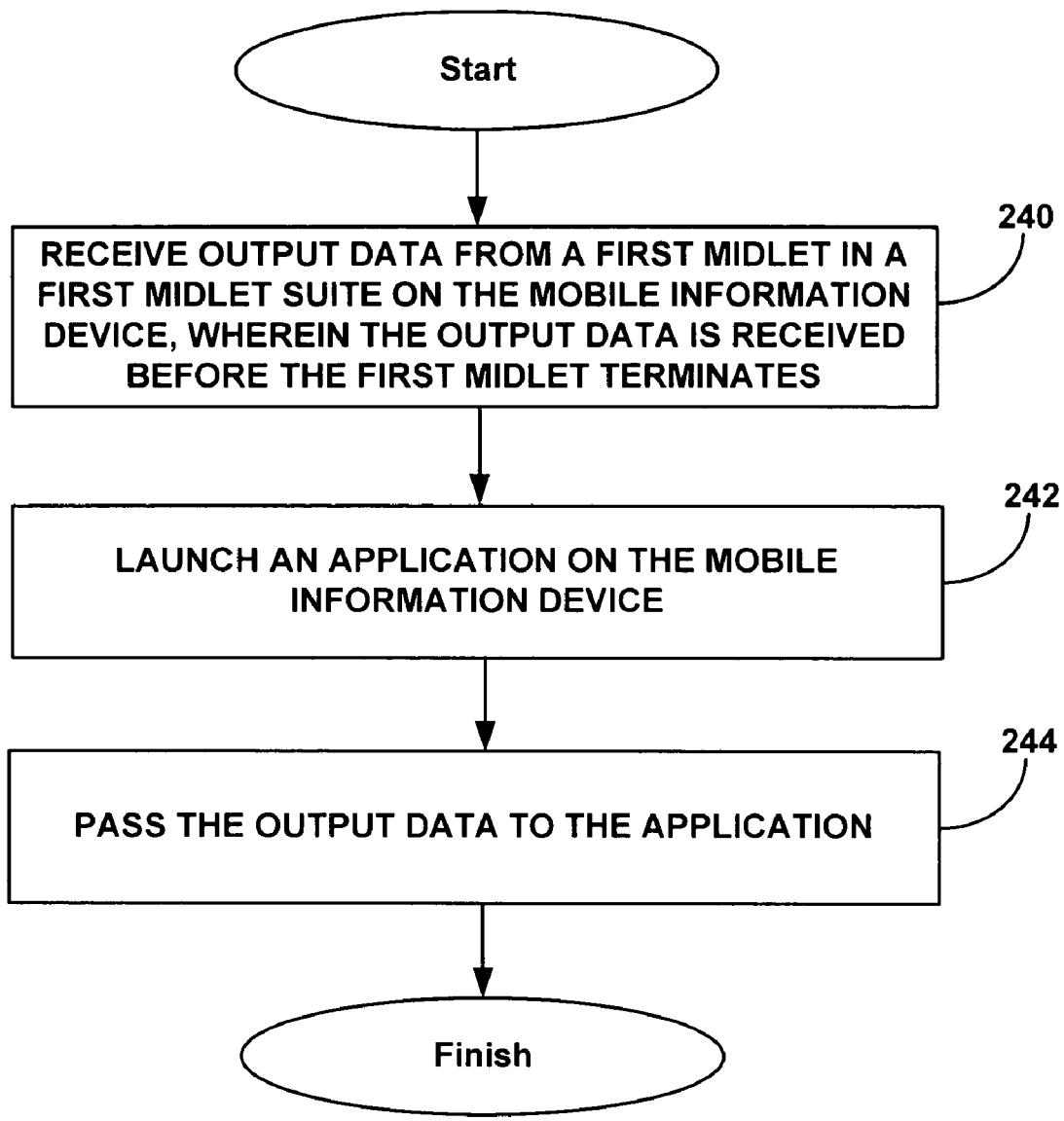
FIG. 14 is a flowchart of an exemplary process for an application management system to pass output data between applications on a mobile information device.

FIG. 14 is a flowchart of an exemplary process for an application management system to pass output data between applications on a mobile information device. At Step 240, the application management system receives output data from a first MIDlet in a first MIDlet suite on the mobile information device, wherein the output data is received before the first MIDlet terminates. At Step 242, the application management system launches an application in the mobile information device. The application may be, for example, a non-MIDlet application or MIDlet in a different MIDlet suite than the first MIDlet. Then, at Step 244, the application management system passes the output data to the application.

Figure 15:
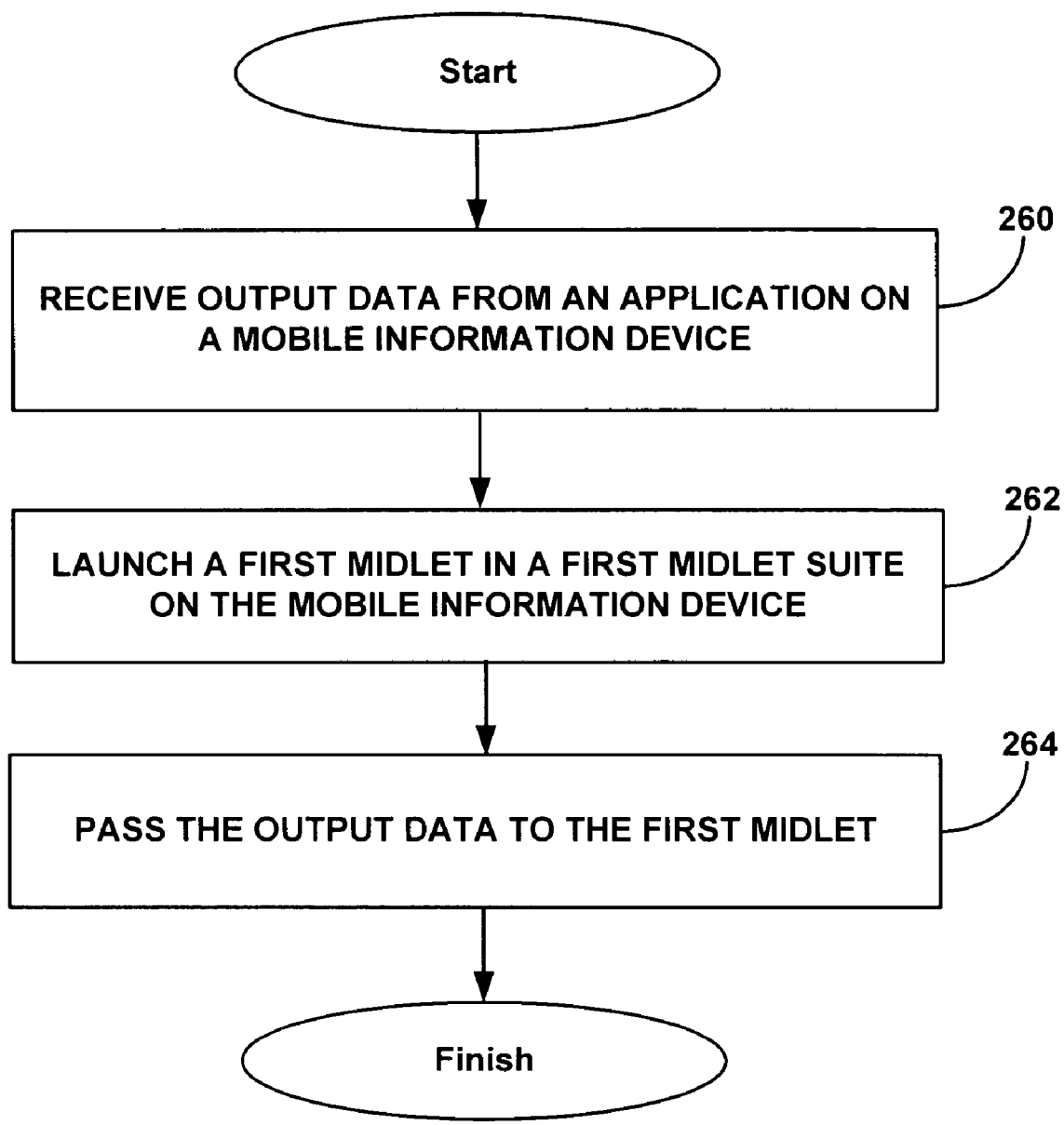
FIG. 15 is a flowchart of an exemplary process for an application management system to exchange data between applications on a mobile information device.

FIG. 15 is a flowchart of an exemplary process for an application management system to exchange data between applications on a mobile information device. At Step 260, the application management system receives output data form an application on the mobile information device. The application may be, for example, a MIDlet or non-MIDlet application. The application management system may then launch a first MIDlet in a first MIDlet suite on the mobile information device. If the application is a MIDlet application, it may be in a different MIDlet suite than the first MIDlet. The application management system may then pass the output data to the first MIDlet, as shown at Step 264.

Figure 16:
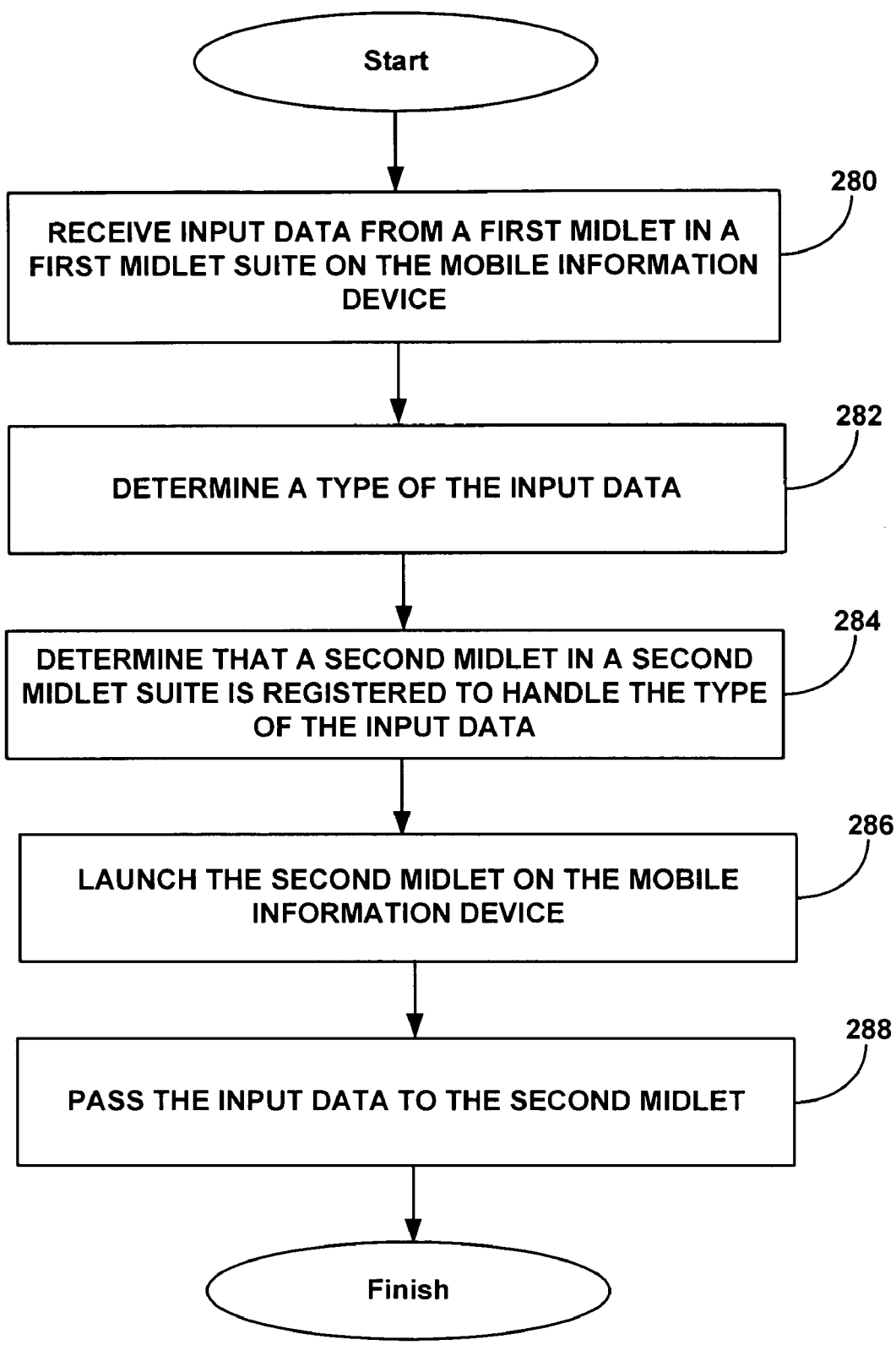
FIG. 16 is a flowchart of an exemplary process for an application management system to pass data between MIDlets in different MIDlet suites on a mobile information device.

FIG. 16 is a flowchart of an exemplary process for an application management system to pass data between MIDlets in different MIDlet suites on a mobile information device. At Step 280, the application management system receives input data form a first MIDlet in a first MIDlet suite on the mobile information device. Then, at Step 282, the application management system determines a type of the input data. The application management system then determines that a second MIDlet in a second MIDlet suite is registered to handle the type of the input data, as shown at Step 284. The application management system then launches the second MIDlet on the mobile information device, as shown at Step 286. Finally, at Step 288, the application management system passes the input data to the second MIDlet.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments in hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for an application management system on a mobile information device to pass data between applications on the mobile information device, the method comprising:
   at the application management system, accepting first data from a first MIDlet application on the mobile information device, wherein the first MIDlet application is identified by a first URI, and wherein the first data comprises a second URI;
   at the application management system, accepting second data from the first MIDlet application on the mobile information device;
   at the application management system, appending the second data to the URI that identifies the first MIDlet application;
   prior to passing the appended second data and the URI that identifies the first MIDlet application to a second MIDlet application on the mobile information device: (i) determining based on a scheme of the second URI that the second MIDlet application is registered to handle the second URI, and (ii) invoking the second MIDlet application; and
   passing the appended second data and the URI that identifies the first MIDlet application from the application management system to the second MIDlet application on the mobile information device.

2. The method of claim 1, wherein accepting the first data from the first MIDlet application includes receiving the first data via a setExitURI( ) object-oriented method, and wherein accepting the second data from the first MIDlet application includes receiving the second data via an appendReferringURI( ) object-oriented method.

3. A method for an application management system on a mobile information device to pass data between applications on the mobile information device, the method comprising:

at the application management system, accepting first data from a first MIDlet application on the mobile information device, wherein the first MIDlet application is identified by a first URI, and wherein the first data comprises a second URI;

at the application management system, accepting second data from the first MIDlet application on the mobile information device;

at the application management system, appending the second data to the URI that identifies the first MIDlet application;

prior to passing the appended second data and the URI that identifies the first MIDlet application to a second MIDlet application on the mobile information device: (i) determining based on a scheme of the second URI and based on additional scheme specific information of the second URI that the second MIDlet application is registered to handle the second URI, and (ii) invoking the second MIDlet application; and passing the appended second data and the URI that identifies the first MIDlet application from the application management system to the second MIDlet application on the mobile information device.

4. The method of claim 3, wherein the scheme of the second URI is ams: or midlet:.

5. A method for an application management system on a mobile information device to pass data between applications on the mobile information device, the method comprising:

at the application management system, accepting first data from a first MIDlet application on the mobile information device, wherein the first MIDlet application is identified by a first URI, and wherein the first data comprises a second URI;

at the application management system, accepting second data from the first MIDlet application on the mobile information device;

at the application management system, appending the second data to the URI that identifies the first MIDlet application; and passing the appended second data and the URI that identifies the first MIDlet application from the application management system to a second MIDlet application on the mobile information device, wherein the appended second data passed to the second MIDlet application allows execution control to be returned to a previous context used before the second MIDlet application was invoked.

6. The method of claim 1, wherein the mobile information device is a mobile phone, a personal digital assistant or a two-way pager.

7. A method for an application management system on a mobile information device to pass data between applications on the mobile information device, the method comprising:

at the application management system, accepting first data from a MIDlet application in a MIDlet suite on the mobile information device, wherein the MIDlet application is identified by a first URI, and wherein the first data comprises a second URI;

at the application management system, accepting second data from the MIDlet application;

at the application management system, appending the second data to the URI that identifies the MIDlet application; and passing the appended second data and the URI that identifies the MIDlet application from the application management system to a non-MIDlet application on the mobile information device.

8. The method of claim 7, further comprising:

prior to passing the appended second data and the URI that identifies the MIDlet application from the application management system to a non-MIDlet application on the mobile information device: (i) determining based on a scheme of the second URI that the non-MIDlet application is registered to handle the second URI, and (ii) invoking the non-MIDlet application.

9. The method of claim 7, further comprising:

prior to passing the appended second data and the URI that identifies the MIDlet application from the application management system to a non-MIDlet application on the mobile information device: (i) determining based on a scheme of the second URI and based on additional scheme specific information of the second URI that the non-MIDlet application is registered to handle the second URI, and (ii) invoking the non-MIDlet application.

10. The method of claim 9, wherein the scheme of the second URI is "ams:" or "midlet:".

11. The method of claim 7, wherein accepting the first data from the MIDlet includes accepting the first data via a setExitURI( ) object-oriented method, and wherein accepting the second data from the MIDlet includes accepting the second data via an appendReferringURI( ) object-oriented method.

12. A method for passing data between applications on a mobile information device, the method comprising:

maintaining an application management system on the mobile information device;

at the application management system, receiving first data from a non-MIDlet application on the mobile information device, wherein the non-MIDlet application is identified by a first URI, and wherein the first data comprises a second URI that identifies a MIDlet application on the mobile information device;

at the application management system, receiving second data from the non-MIDlet application on the mobile information device;

at the application management system, appending the second data to the URI that identifies the non-MIDlet application;

launching the MIDlet application on the mobile information device; and passing the appended second data and the URI that identifies the non-MIDlet application from the application management system to the MIDlet application.

13. A computer-readable medium containing instructions for causing a processor to execute the steps of the method of claim 1.

14. A computer-readable medium containing instructions for causing a processor to execute the steps of the method of claim 7.

15. A computer-readable medium containing instructions for causing a processor to execute the steps of the method of claim 12.

16. A method for an application management system on a mobile information device to pass data between applications on the mobile information device, the method comprising:

at the application management system, accepting first data from a first MIDlet application on the mobile information device, wherein the first MIDlet application is identified by a first URI, and wherein the first data comprises a second URI;

at the application management system, accepting second data from the first MIDlet application on the mobile information device;

at the application management system, appending the second data to the URI that identifies the first MIDlet application; and passing the appended second data and the URI that identifies the first MIDlet application from the application management system to a second MIDlet application on the mobile information device, wherein the first MIDlet application and the second MIDlet application are in a MIDlet suite on the mobile information device.

17. A method for an application management system on a mobile information device to pass data between applications on the mobile information device, the method comprising:

at the application management system, accepting first data from a first MIDlet application on the mobile information device, wherein the first MIDlet application is identified by a first URI, and wherein the first data comprises a second URI;

at the application management system, accepting second data from the first MIDlet application on the mobile information device;

at the application management system, appending the second data to the URI that identifies the first MIDlet application; and passing the appended second data and the URI that identifies the first MIDlet application from the application management system to a second MIDlet application on the mobile information device, wherein the first MIDlet application is in a first MIDlet suite on the mobile information device and the second MIDlet application is in a second MIDlet suite on the mobile information device.

18. The method of claim 1, wherein the scheme of the URI is tel:.

19. The method of claim 1, wherein the scheme of the URI is midlet:.

20. The method of claim 1, wherein the scheme of the URI is im:.

21. The method of claim 1, wherein the scheme of the URI is http:.

22. The method of claim 1, wherein the scheme of the URI is https:.

23. A method for an application management system on a mobile information device to pass data between applications on the mobile information device, the method comprising:

at the application management system, accepting first data from a first MIDlet application on the mobile information device, wherein the first MIDlet application is identified by a first URI, and wherein the first data comprises a second URI;

at the application management system, accepting second data from the first MIDlet application on the mobile information device;

at the application management system, appending the second data to the URI that identifies the first MIDlet application; and passing the appended second data and the URI that identifies the first MIDlet application from the application management system to a second MIDlet application on the mobile information device, wherein passing the appended second data and the URI that identifies the first MIDlet application from the application management system to the second MIDlet application is carried out in response to the second MIDlet application sending a request to the application management system.

24. The method of claim 23, wherein the request sent to the application management system comprises a request selected from the group consisting of: (i) a request for data via a getMediaType( ) object oriented method, (ii) a request for data via a getContentType( ) object-oriented method, (iii) a request for data via a getMuglet( ) object-oriented method, (iv) a request for data via a getReferringURI( ) object-oriented method, and (v) a request for data via a getURI( ) object-oriented method.

25. The method of claim 7, wherein passing the appended second data and the URI that identifies the MIDlet application from the application management system to the non-MIDlet application on the mobile information device is carried out in response to the non-MIDlet application sending a request to the application management system.

26. The method of claim 25, wherein the request sent to the application management system comprises a request selected from the group consisting of: (i) a request for data via a getMediaType( ) object oriented method, (ii) a request for data via a getContentType( ) object-oriented method, (iii) a request for data via a getMuglet( ) object-oriented method, (iv) a request for data via a getReferringURI( ) object-oriented method, and (v) a request for data via a getURI( ) object-oriented method.

27. The method of claim 12, wherein passing the appended second data and the URI that identifies the non-MIDlet application from the application management system to the MIDlet application is carried out in response to the MIDlet application sending a request to the application management system.

28. The method of claim 1, wherein the URI passed to the second MIDlet application from the application management system allows execution control to be returned to a previous context used before the second MIDlet application was invoked.

29. The method of claim 8, wherein the URI passed to the second non-MIDlet application from the application management system allows execution control to be returned to a previous context used before the non-MIDlet application was invoked.

30. The method of claim 12, wherein the URI passed to the MIDlet application from the application management system allows execution control to be returned to a previous context used before the MIDlet application was launched.

* * * * *